United States Patent
Deng et al.

(10) Patent No.: US 10,866,986 B2
(45) Date of Patent: Dec. 15, 2020

(54) METHOD, APPARATUS AND SYSTEM FOR BROWSING IMAGES ON A USER INTERFACE DISPLAYING A MAP

(71) Applicant: CANON KABUSHIKI KAISHA, Tokyo (JP)

(72) Inventors: Dixon De Sheng Deng, East Ryde (AU); Julie Rae Kowald, Dundas Valley (AU); Nicholas Grant Fulton, Turramurra (AU); Oscar Alejandro De Lellis, Drummoyne (AU)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 16/155,369

(22) Filed: Oct. 9, 2018

(65) Prior Publication Data
US 2019/0121878 A1 Apr. 25, 2019

(30) Foreign Application Priority Data
Oct. 20, 2017 (AU) .................. 2017248569

(51) Int. Cl.
*G06F 17/00* (2019.01)
*G06F 16/54* (2019.01)
(Continued)

(52) U.S. Cl.
CPC .............. *G06F 16/54* (2019.01); *G06F 3/017* (2013.01); *G06F 3/0482* (2013.01);
(Continued)

(58) Field of Classification Search
CPC ........ G06F 16/54; G06F 16/16; G06F 16/538; G06F 16/587; G06F 16/532; G06F 16/29; G06F 3/017; G06F 3/04817; G06F 3/0482; G06F 3/04842; G06F 3/0485; G06F 3/04883
(Continued)

(56) References Cited

U.S. PATENT DOCUMENTS 8,103,956 B2 * 1/2012 Trujillo ............... G06F 3/04892
715/700
8,438,477 B2 * 5/2013 Hara ..................... G06T 3/0012
715/273
(Continued)

OTHER PUBLICATIONS

Zurita et al., A Face-to-Face System for Supporting Mobile Collaborative Design Using Sketches and Pen-based Gestures, IEEE 2006, pp. 1-6. (Year: 2006).*
(Continued)

*Primary Examiner* — Cong-Lac Huynh
(74) *Attorney, Agent, or Firm* — Canon U.S.A., Inc. IP Division

(57) ABSTRACT

A method of browsing images on a user interface displaying a map. A selection of a geographical feature within the map on the user interface is received based on a selection criteria comprising a set of predefined gesture rules. A plurality of images is selected based on a proximity of each of the images to the selected geographical feature. A dynamic browsing widget is generated on the user interface having dimensions proportional to dimensions of the selected geographical feature. The selected plurality of images is browsed using the generated dynamic browsing widget.

18 Claims, 24 Drawing Sheets

(51) Int. Cl.
*G06F 3/0484* (2013.01)
*G06F 3/01* (2006.01)
*G06F 16/29* (2019.01)
*G06F 3/0482* (2013.01)
*G06F 16/587* (2019.01)
*G06F 3/0488* (2013.01)
*G06F 3/0485* (2013.01)
*G06F 3/0481* (2013.01)
*G06F 16/538* (2019.01)
*G06F 16/532* (2019.01)

(52) U.S. Cl.
CPC ........ *G06F 3/0485* (2013.01); *G06F 3/04817* (2013.01); *G06F 3/04842* (2013.01); *G06F 3/04883* (2013.01); *G06F 16/29* (2019.01); *G06F 16/532* (2019.01); *G06F 16/538* (2019.01); *G06F 16/587* (2019.01)

(58) Field of Classification Search
USPC .......................................... 715/700
See application file for complete search history.

(56) References Cited

U.S. PATENT DOCUMENTS

| | | | |
|---|---|---|---|
| 8,564,865 B2 | 10/2013 | Klug et al. | |
| 8,576,222 B2 | 11/2013 | Handley et al. | |
| 2008/0109392 A1* | 5/2008 | Nandy | G06N 5/025 706/47 |
| 2008/0126937 A1* | 5/2008 | Pachet | G06F 3/017 715/720 |
| 2008/0275638 A1* | 11/2008 | Cummings | G01C 21/3476 701/533 |
| 2016/0308985 A1* | 10/2016 | Qi | H04L 51/32 |

OTHER PUBLICATIONS

McCrickard et al., Beyond the Scrollbar: An Evolution and Evaluation of Alternative Navigation Techniques, IEEE 2002, pp. 1-8. (Year: 2002).*

Miau et al., SpaceTokens: Interactive Map Widgets for Location-centric Interactions, ACM 2018, pp. 1-12. (Year: 2018).*

* cited by examiner

METHOD, APPARATUS AND SYSTEM FOR BROWSING IMAGES ON A USER INTERFACE DISPLAYING A MAP

REFERENCE TO RELATED PATENT APPLICATION

This application claims the benefit under 35 U.S.C. § 119 of the filing date of Australian Patent Application No. 2017248569, filed Oct. 20, 2017, hereby incorporated by reference in its entirety as if fully set forth herein.

TECHNICAL FIELD

The present invention is related to the field of user interfaces on portable devices and, in particular, to browsing collections of images with spatio-temporal constraints. The present invention is also related to a method and apparatus for browsing images on a user interface displaying a map, and to a computer program product including a computer readable medium having recorded thereon a computer program for browsing images on a user interface displaying a map.

BACKGROUND

A collection of images taken by one or more digital cameras is often displayed in a grid or list for image browsing. Another common method is to display the images on a map—based on global positioning system (GPS) metadata associated with the images. For example, Canon Inc's Map Utility software displays images on a list as well as on a map.

Images displayed on a map may be represented by the location of the images being shown as a pin on the map, although sometimes the images appear on the map as a thumbnail image. At other times, it may be necessary to select the pin on the map to view extra information about the image. Such extra information may be displayed as a popup appearing on the map, typically with the preview of the image that the pin represented. One disadvantage of displaying an image on a map is that the effect of sorting the images by time, or other properties, is lost.

Images displayed as a list may be represented by a preview of the image. The images in the list are typically sorted by a sortable metadata, such as a timestamp of the image. One disadvantage of displaying an image on a list/grid view is that reference to a location of the image is not clearly visible as the reference was on a map.

The usability of browsing and selecting an image on a map or a list/grid begins to diminish as the number and density (in particular for maps) of images increases. Filters based on image metadata, such as a timestamp or camera model, camera owner, serial number, or the like, may be used to reduce the number of images displayed on a map or on a list/grid of images.

A problem occurs when there are a lot of images and a user wishes to browse through the images for a purpose that is dependent on the location of the images. In this case, the images cannot be displayed in a list of images since the location aspect is lost. If the image pins are viewed on a map, then the images cannot be scrolled through easily since there is no scroll order that is easily defined. The user has to cherry pick individual pins to view image previews associated with the pins. If the images are displayed in a map and a list or in a map and a grid, then the order that the images are seen in the grid has little bearing on the order that the images are seen in the map, and vice versa. For example, two people may capture images of rows of vines in a vineyard and the people may begin from the opposite ends of a row. If the images were displayed to a user in a time-ordered sequence in a grid or list the images of the rows of vines would be displayed alternatingly from either end of the row—an undesirable viewing pattern. If the images were viewed on a map, the user would have to single-tap on each image pin—an undesirable viewing pattern. A user is thus left with no reasonable way to browse through location sensitive images once there are too many images.

A similar problem occurs when the images are all located very close to each other. If such closely located images are displayed on a map, the images will appear as a heavy cluster of pins that may possibly not be able to be reliably selected individually. Alternatively, the closely located images may appear as a pin that when selected shows a list of images belonging in that area of the pins. Either way, the user is left with something unusable. As before, if the closely located images are viewed on a list or grid, the location aspect is lost and the user cannot navigate the images for their location-sensitive purpose.

Conventional methods have attempted to rectify the above problems using methods like filtering, grouping or clustering, according to properties of the image, subject, etc. These conventional methods are insufficient as the methods do not solve the problem of browsing. Conventional methods only reduce the data displayed at any one time.

SUMMARY

It is an object of the present invention to substantially overcome, or at least ameliorate, one or more disadvantages of existing arrangements.

According to one aspect of the present disclosure, there is provided a method of browsing images on a user interface displaying a map, the method comprising:

receiving a selection of a geographical feature within the map on the user interface based on a selection criteria comprising a set of predefined gesture rules;

selecting a plurality of images based on a proximity of each of the images to the selected geographical feature;

generating a dynamic browsing widget on the user interface having dimensions proportional to dimensions of the selected geographical feature; and browsing the selected plurality of images using the generated dynamic browsing widget.

According to another aspect of the present disclosure, there is provided an apparatus for browsing images on a user interface displaying a map, the apparatus comprising:

means for receiving a selection of a geographical feature within the map on the user interface based on a selection criteria comprising a set of predefined gesture rules;

means for selecting a plurality of images based on a proximity of each of the images to the selected geographical feature;

means for generating a dynamic browsing widget on the user interface having dimensions proportional to dimensions of the selected geographical feature; and means for browsing the selected plurality of images using the generated dynamic browsing widget.

According to still another aspect of the present disclosure, there is provided a system for browsing images on a user interface displaying a map, the system comprising:

a memory for storing data and a computer program;

a processor coupled to the memory for executing the computer program, the computer program having instructions for:

receiving a selection of a geographical feature within the map on the user interface based on a selection criteria comprising a set of predefined gesture rules;

selecting a plurality of images based on a proximity of each of the images to the selected geographical feature;

generating a dynamic browsing widget on the user interface having dimensions proportional to dimensions of the selected geographical feature; and browsing the selected plurality of images using the generated dynamic browsing widget.

According to still another aspect of the present disclosure, there is provided a non-transitory computer readable medium having a computer program stored on the medium for browsing images on a user interface displaying a map, the program comprising:

receiving a selection of a geographical feature within the map on the user interface based on a selection criteria comprising a set of predefined gesture rules;

selecting a plurality of images based on a proximity of each of the images to the selected geographical feature;

generating a dynamic browsing widget on the user interface having dimensions proportional to dimensions of the selected geographical feature; and browsing the selected plurality of images using the generated dynamic browsing widget.

Other aspects of the invention are also disclosed.

BRIEF DESCRIPTION OF THE DRAWINGS

One or more embodiments of the disclosure will now be described with reference to the following drawings, in which.

DETAILED DESCRIPTION INCLUDING BEST MODE

Disclosed are arrangements for viewing images on a map rather than a grid or list; where the user needs to browse many images taken proximal to a geographical feature, such as a creek, a plantation, a road, a vineyard or other structures that are visible on the map. The disclosed arrangements may be used where the images have been captured at different spatial locations along the geographical feature. A map may be a street map, a terrain map, a vineyard map, a topographical map, a network map (2D or 3D) such as a sewer system, water pipeline system, a road map, a transport map, or any other type of map. For example, a road assessment vehicle may traverse a road while recording images of the road surface for inspection purposes. The disclosed arrangements may be used to facilitate a later review of the images, perhaps by a supervisor, for example to ensure that the images were properly captured and also to quickly examine any issues that may have been present on the road surface.

One example where the disclosed arrangements may be used is in a vineyard where grape vines are grown. The grape vines are grown in rows and the vines are supported by structures to ensure the vines remain on the row and that the vines grow in a predictable manner. Rows of grape vines are classified into blocks, where a block normally only grows one variety of grapes. Normally, vehicles like tractors, harvesters and quad-bikes are used to traverse the rows for purposes such as harvesting, crop maintenance and crop inspection. Vineyard staff normally keep records of disease, crop status and infrastructure problems. These records may include images to back up the assessment of the vineyard staff.

To reduce manual labour, vineyard vehicles may be equipped with cameras for capturing images automatically while the vehicle traverses the rows in the vineyard to perform an unrelated task. Although the automatic image capture saves manual labour for image capture, manual labour may still be required for inspecting the images—this is highly undesirable since now there are thousands of images of the grape vines, captured near each other, captured within a short amount of time between each other, that all look very similar.

To facilitate the task of browsing or inspecting the images of the grape vines, the images may be automatically grouped into blocks. Methods such as filter-selecting may be used to limit the number of pins viewed on a map for the images. However, beyond methods such as filter selecting, there is nothing available to help the user browse through the images that were taken of a row. The problem is exacerbated when there are, in fact, many images of adjacent rows and the user is trying to keep their attention to the images of a particular row of vines.

Figure 3:
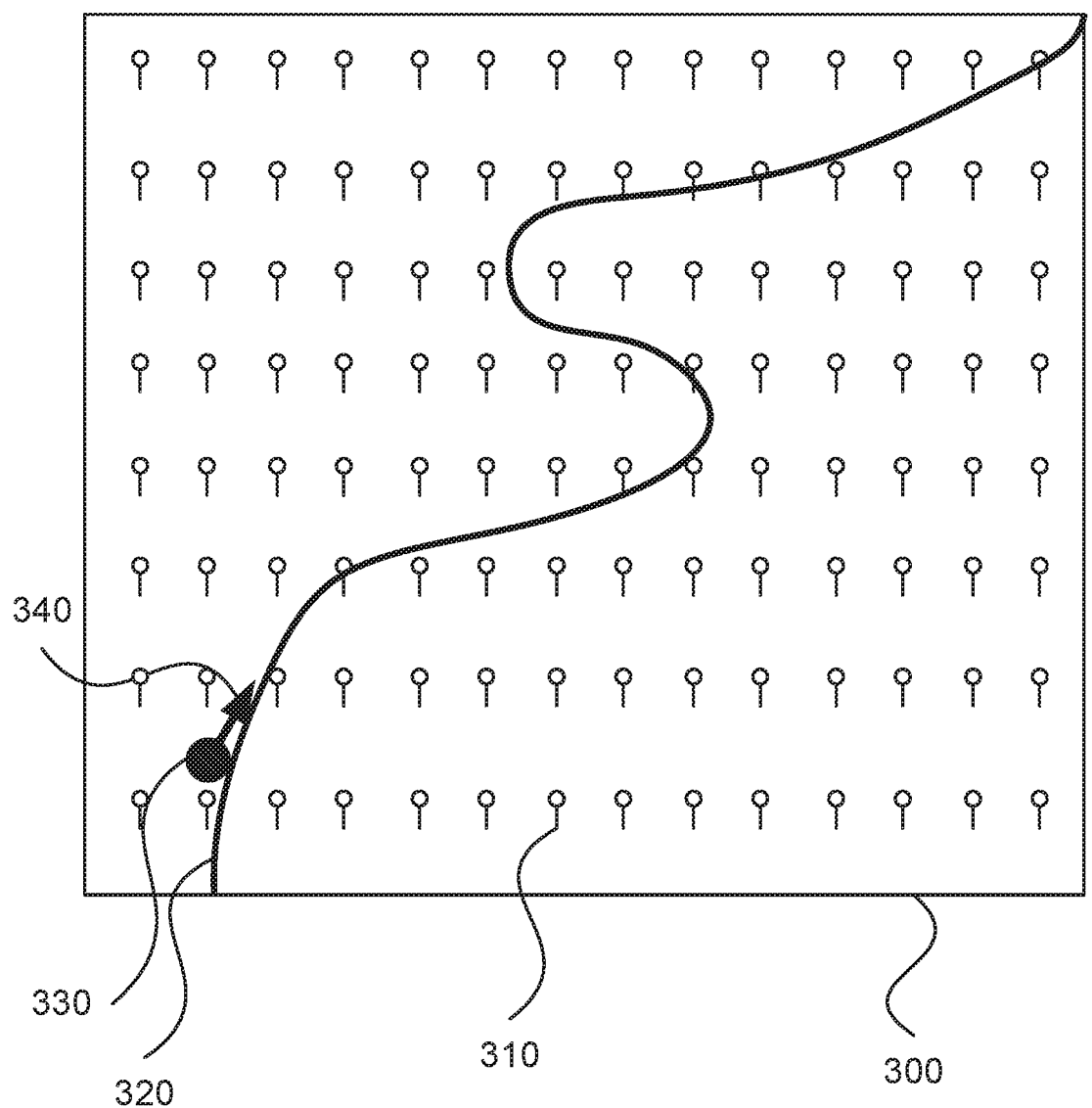
FIG. 3 shows by way of example a map view resulting from a user performing a touch interaction on a map with an initial touch point and in the direction of a movement vector.

FIG. 3 shows an example map 300 that contains a geographical feature (such as geographical feature 320) and pins (such as pin 310) corresponding to the location of data with geographical information, such data may contain an image. The data may be selected from a larger set of data that may have been filtered according to some existing filters. The existing filters may include a date filter, coarse location filter (e.g., a city, suburb, district, or boundaries of a private land such as a vineyard, orchard, water treatment plant, etc), image properties, or a tag. In one example, a user may wish to browse the images captured near a geographical feature using the map 300.

A filter which filters the data according to a tag can filter the data by reading one or more tags recorded in the meta-data of the data. Alternatively, in the case of the data including an image, the tags may be recorded in the image meta-data. The tags can relate to a subject, a task or other topics. A tag can also have a numerical or other type of value associated with the tag.

Tags related to a subject, hereafter referred to as a subject tag, are typically used to represent a score-type of the subject such as a property, a status, a condition, or otherwise, of the subject being photographed. Such a subject tag is not limited to a visual attribute or appearance of the subject, but can also apply to a calculated, measured, sampled, or a personal opinion attribute. The following are examples of subject tags when the subject being photographed is a crop or a plant:
(i) Growth stage of a crop,
(ii) disease or malaise,
(iii) toxicity,
(iv) nutritional aspects,
(v) yield estimate,
(vi) pH,
(vii) Brix,
(viii) Baume,
(ix) Titratable Acidity (Ta),
(x) a personal assessment of the health of a crop or presence and type of an insect or otherwise.

The value associated with a subject tag represents an intensity of the score-type, where the intensity can represent a count, a level of incidence, a severity measure, a percentage, an absolute value, a relative value, a discrete value, or a value from a pre-determined list of values associated with the tag. For example, a subject tag with the score-type of "yield estimate" would have its value representing the intensity of a count; such that the tag can be used to represent that the subject had a count of 50 (for example) for a yield estimate. Similarly, a tag could represent a subject having a pH of 8.3 (for example); another example is a tag representing a subject with a severity intensity set to "high" of a particular crop disease—such as Powdery Mildew Tags related to a task, hereafter referred to as a task tag are typically used to represent an action that was undertaken during the recording of the image. The performed action is the score-type and the intensity of the score-type is the value associated with the tag. For example, a vehicle performing the task of spraying pesticide may have a task tag with a score-type of pesticide-spraying with the intensity being related to the degree of the application of the pesticide. Another example is a vehicle performing a task of cutting grass may have the intensity recorded for the height at which the grass was cut.

The value associated with a task tag can vary throughout the performing of the task. For example, the height of grass cutting may vary, and the pesticide application may vary according to the flow rate being adjusted, the spray mechanism being on or off, the number of spray nozzles being on or off, a varying direction of the spray nozzles, whether a nozzle is set to a wide or narrow spray pattern, or the pressure of the pesticide going through each nozzle. Other examples of the value associated with a task tag varying throughout the performing of the task may also exist. However, the value recorded with the task tag on an image represents a snapshot of the intensity of the score-type when the image was captured.

Figure 1A:
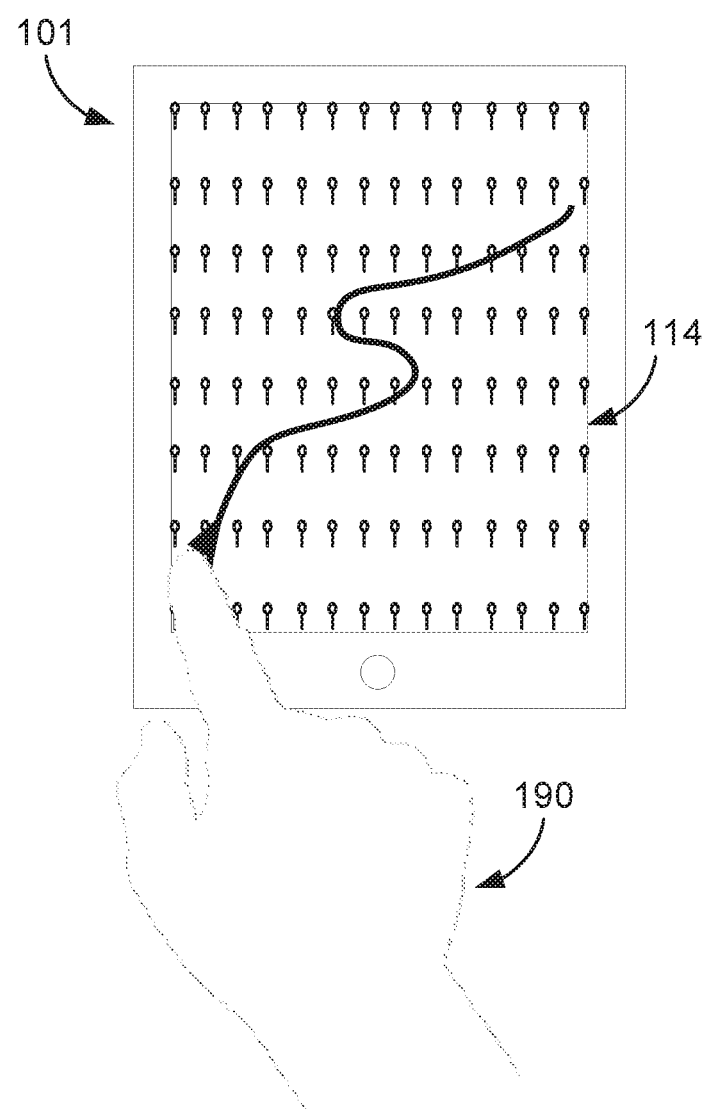
FIGS. 1A, 1B, and 1C collectively form a schematic block diagram representation of an electronic device upon which described arrangements can be practiced.
Figure 1B:
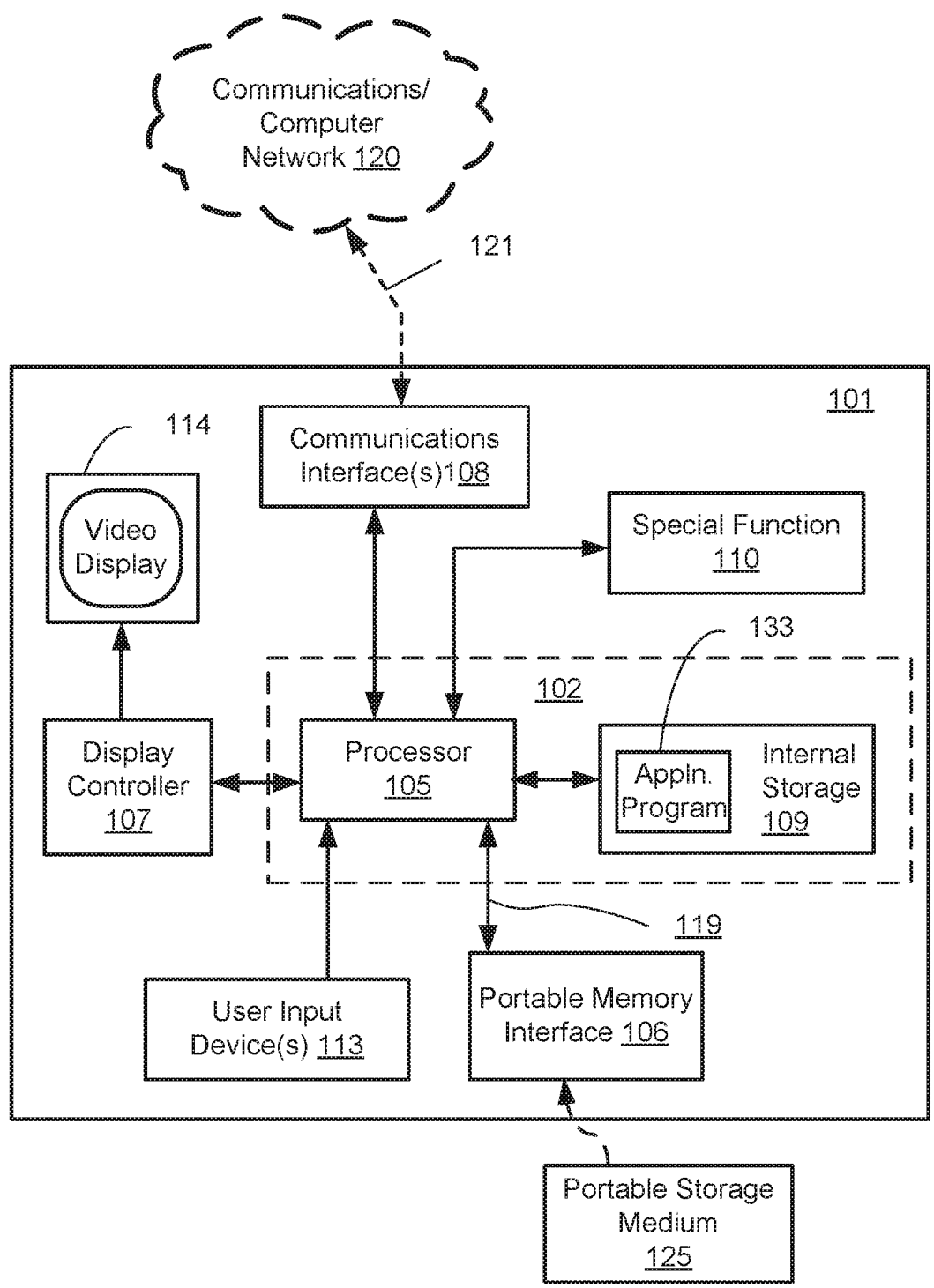
Figure 1C:
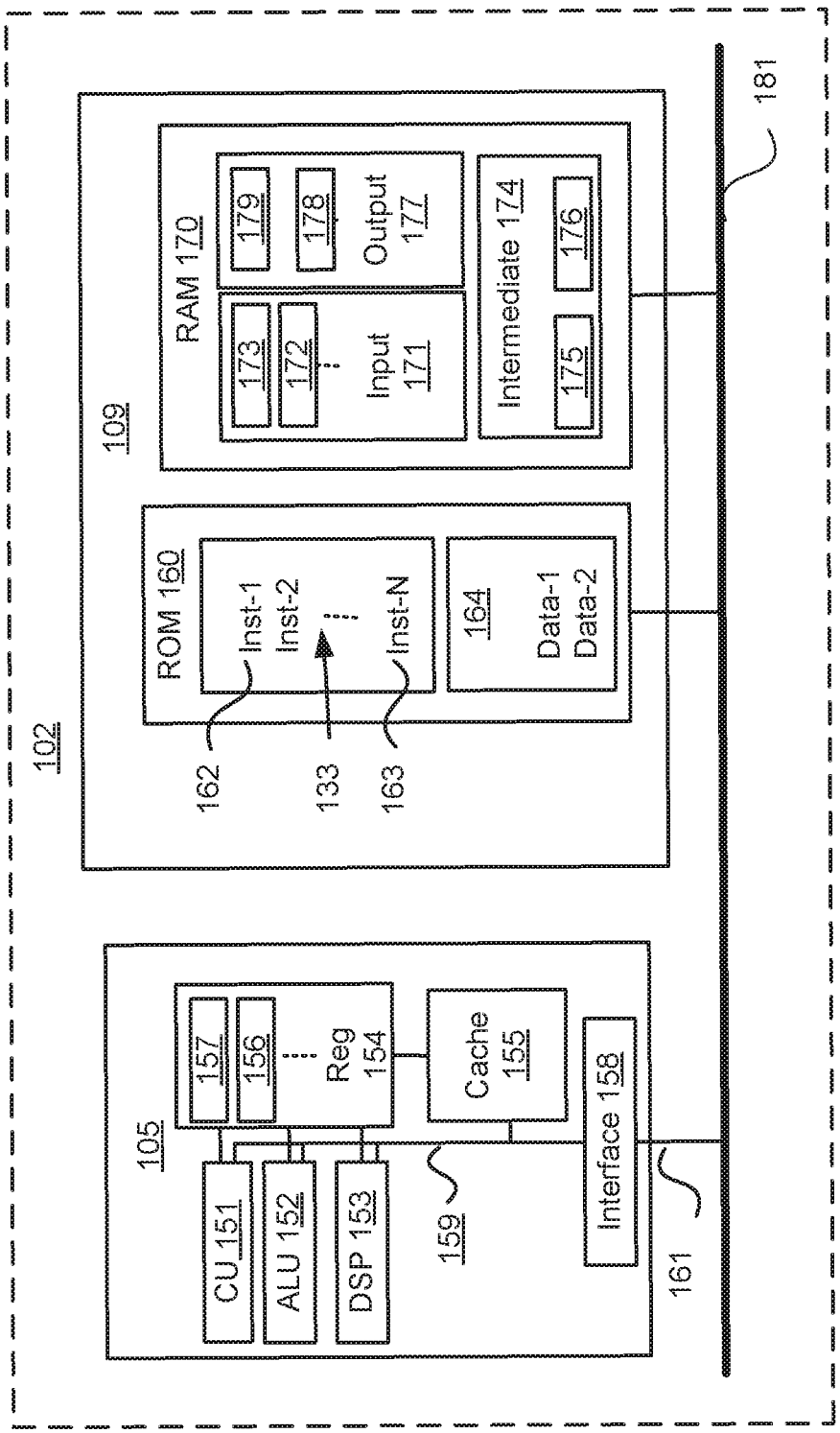

FIGS. 1A, 1B and 1C collectively form a tablet device 101, including embedded components, upon which methods to be described below are desirably practiced. For the device 101, processing resources are limited. Nevertheless, the methods to be described may also be performed on higher-level devices, with suitable input methods, such as desktop computers, server computers, and other such devices with significantly larger processing resources.

As seen in FIG. 1B, the device 101 comprises an embedded controller 102. Accordingly, the device 101 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1C. The RAM 170 may be volatile, non-volatile or a combination of volatile and non-volatile memory.

The device 101 includes a display controller 107, which is connected to a video display 114, such as a liquid crystal display (LCD) panel or the like. The display controller 107 is configured for displaying graphical images on the video display 114 in accordance with instructions received from the embedded controller 102, to which the display controller 107 is connected.

The electronic device 101 also includes user input devices 113 which are typically formed by keys, a keypad or like controls. In the example of FIG. 1A, the user input devices 113 include a touch sensitive panel physically associated with the display 114 to collectively form a touch-screen responsive to a touch interaction (e.g., with a user's hand 190). Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1B, the device 101 also comprises a portable memory interface 106, which is coupled to the processor 105 via a connection 119. The portable memory interface 106 allows a complementary portable memory device 125 to be coupled to the device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The device 101 also has a communications interface 108 to permit coupling of the device 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like Typically, the device 101 is configured to perform some special function. The embedded controller 102, possibly in conjunction with further special function components 110, is provided to perform that special function. For example, the device 101 may include a digital camera and the components 110 may represent a lens, focus control and image sensor of the camera. The special function components 110 are connected to the embedded controller 102. As the device 101 is a portable device, the special function components 110 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 102, where the processes of FIGS. 2, 4, 5 and 6, may be implemented as one or more software application programs 133 executable within the embedded controller 102. The device 101 of FIGS. 1A, 1B and 1C implements the described methods. In particular, with reference to FIG. 1C, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the electronic device 101. However, in some instances, the application programs 133 may be supplied to the user encoded on one or more CD-ROM (not shown) and read via the portable memory interface 106 of FIG. 1B prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1B. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1C illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the electronic device 101. Typically, the application program 133 waits for events and subsequently executes the block of code associated with that event. Events may be triggered in response to input from a user, via the user input devices 113 of FIG. 1B, as detected by the processor 105. Events may also be triggered in response to other sensors and interfaces in the electronic device 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the device 101.

A method 200 of browsing images on a user interface displaying a map on the display screen 114, in which the user's hand 190 may perform a touch interaction on the display screen 114. The method 200 may be implemented as one more software code modules of the application program 133 resident in the ROM 160 and being controlled in its execution by the processor 105.

In response to a touch interaction being performed on the screen 114, the method 200 begins at identifying step 210, where the gesture being performed is identified under execution of the processor 105. The gesture is identified at step 210 according to a set of predefined gesture rules. A method 400 of identifying a gesture, as executed at step 210, will be described in detail below with reference to FIG. 4.

Then the method 200 proceeds to geographical feature selecting step 220, where a geographical feature from the displayed map is selected according to the identified gesture. The device 101 is configured for receiving the selection of the geographical feature included within the displayed map based on selection criteria comprising the set of predefined gesture rules. A method 500 of selecting a geographical feature, as executed at step 220, will be described in detail below with reference to FIG. 5.

The method 200 continues at image selecting step 230, where images for the geographical feature selected at step 220 are selected according to the proximity of each image to the selected geographical feature. A plurality of images may be selected at step 230. At step 230, in selecting the images for the selected geographical feature, filters may be applied to the images. The filters applied at step 230 may include, for example, task tags, subject tags, image meta-data (e.g., timestamp, GPS location, and other meta-data commonly found in images), camera settings, etc. As described below, the selection of the plurality of images at step 230 may be based on a tag (e.g., a task tag, a subject tag) selected using the gesture on the user interface. A method 600 of selecting images for a geographical feature, as executed at step 230, will be described in detail below with reference to FIG. 6.

Next, the method 200 proceeds to generating step 240, where a dynamic browsing widget is generated for the selected geographical feature under execution of the processor 105. The terms "dynamic browsing widget" and "dynamic scroll widget" are used interchangeably throughout the description. As described in detail below, the generated dynamic browsing widget may have dimensions proportional to dimensions of the geographical feature selected at step 220.

The user is then enabled to browse the selected images for the selected geographical feature at browsing step 250, by scrolling through the dynamic scroll widget. The advantage of the method 200 over existing methods is that the user is able to scroll through the images using the dynamic scroll widget rather than having to individually select pins of images on the map displayed on the device 101. Moreover, the images on the displayed map that may be browsed by the user will be images proximal to the geographical feature, rather than being images that are not proximal but were accidentally selected due to user fatigue, density, etc.

FIG. 3 shows by way of example a view of a map 300 resulting from a user performing a touch interaction with an initial touch point 330 and in the direction of a movement vector 340. In the example of FIG. 3, the method 200 at step 210 has identified the touch interaction as a drag gesture, with the start of the drag being the initial touch point 330 and the direction of the drag being the movement vector 340.

Figure 4:
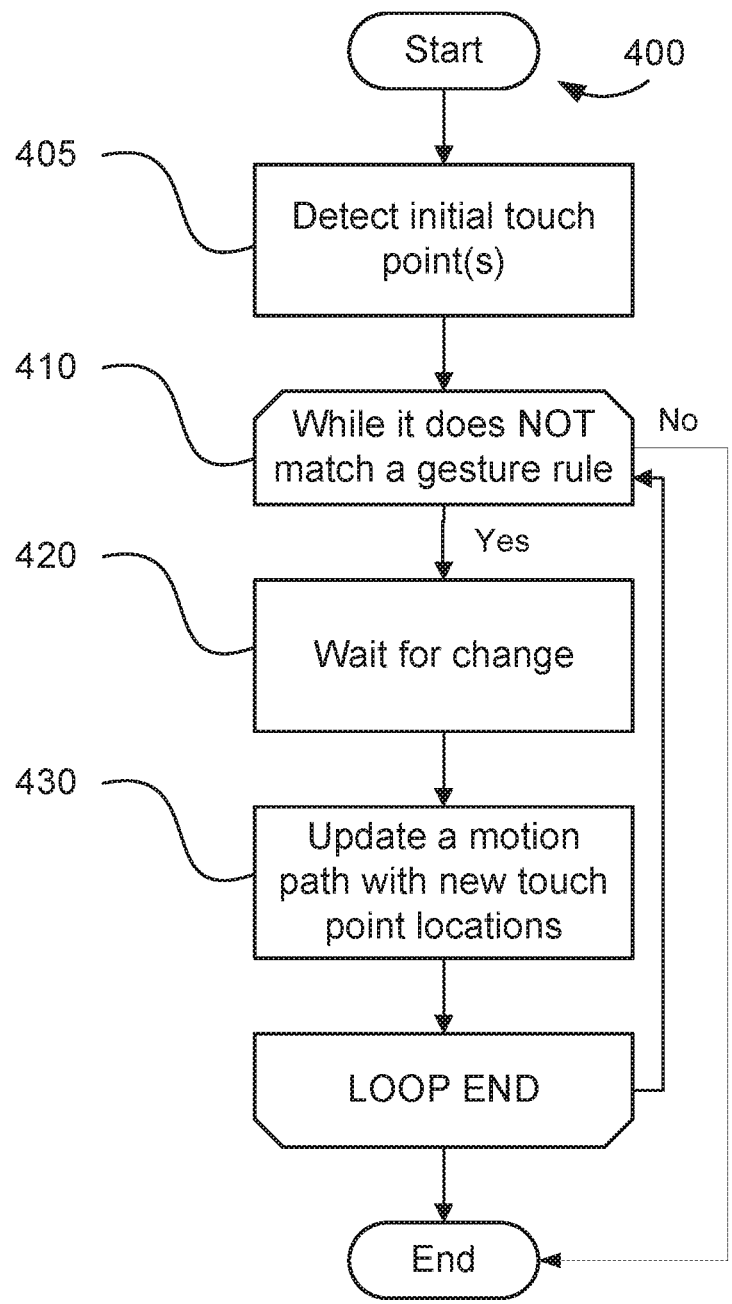
FIG. 4 is a flow diagram showing a method of identifying a gesture, as executed in the method of FIG. 2.

The method 400 of identifying a gesture, as executed at step 210, will now be described with reference to FIG. 4. The method 400 may be implemented as one more software code modules of the application program 133 resident in the ROM 160 and being controlled in its execution by the processor 105. The method 400 will be described with reference to the example of FIG. 3.

As described above, a user may use the screen 114 to operate the device 101. At detecting step 405, an interaction on the screen 114 is detected as initial touch point(s), under execution of the processor 105. The initial touch point(s) detected at step 405 may be stored in RAM 170 as motion path values, under execution of the processor 105. The initial touch point(s) may correspond to one or more fingers on the screen 114. Alternatively, the initial touch points may correspond to one or more points on the screen 114 touched by a touch pen or stylus pen provided for use with the screen. However, it is impractical to expect a user to place their fingers on the touch surface simultaneously, so there is a time and distance tolerance applied at step 405 so that the method 400 only progresses from step 405 to step 410 after either the time or distance tolerance has occurred. The time tolerance can be appreciated in existing touch screen devices when a user taps on or touches the screen and after the time tolerance a context menu appears. Similarly, the distance tolerance can be appreciated in a touch screen device when a user touches the screen and nothing happens until the touch location has moved slightly. The time and distance tolerance are typically set by the device 101.

At gesture matching step 410, a loop begins, where the initial touch points and a recorded motion path of the touch points are checked to determine whether the initial touch points and the recorded motion path match a gesture rule. A gesture rule is a set of predefined conditions relating to the number of initial touch points and touch point changes, the changes comprising moving, de-touching and re-touching. When a condition in the set of conditions is met then a gesture is determined to have occurred, under execution of the processor 105. The gesture may be comprised, for example, of a tap, single tap, drag, double tap, double tap and drag, lock-the-map, geographical-feature-lock, scrolling or panning. In one example, a short-tap may be described by a gesture rule that requires a touch-down (i.e., touching the touch surface with a finger) and within a configurable time delay, a touch-up to occur (i.e., removing the finger from the touch surface), but without having moved the touch point beyond the distance tolerance.

At step 410, if there is no gesture rule matched, then the method 400 will proceed to waiting step 420. Otherwise, the method 400 shall end the loop, returning the gesture that matched the gesture rule at step 410.

At waiting step 420, there is a wait until information about any touch points having changed, after which the method 400 proceeds to updating step 430. At step 430, the record of motion paths performed by the touch points are updated as well as any new touch points added or old touch points removed. The updated motion paths may be stored in RAM 170 as motion path values, under execution of the processor 105. In the case where the motion path may travel in an opposite direction to an initial direction of travel then that retrograde motion does not undo any values in the recorded motion path, rather the motion continues contributing in the same order as the motion is recorded. For example, a motion path traversing through coordinates A, B, C, D, E, D, C, B will be recorded as A, B, C, D, E, D, C, B and will not be recorded as just A.

As a result of the gesture being detected in accordance with the method 400, at step 220 the geographical feature 320 is selected since the initial touch point 330 is near the geographical feature 320 and the movement vector 340 results in a motion path with points nearby.

Figure 5:
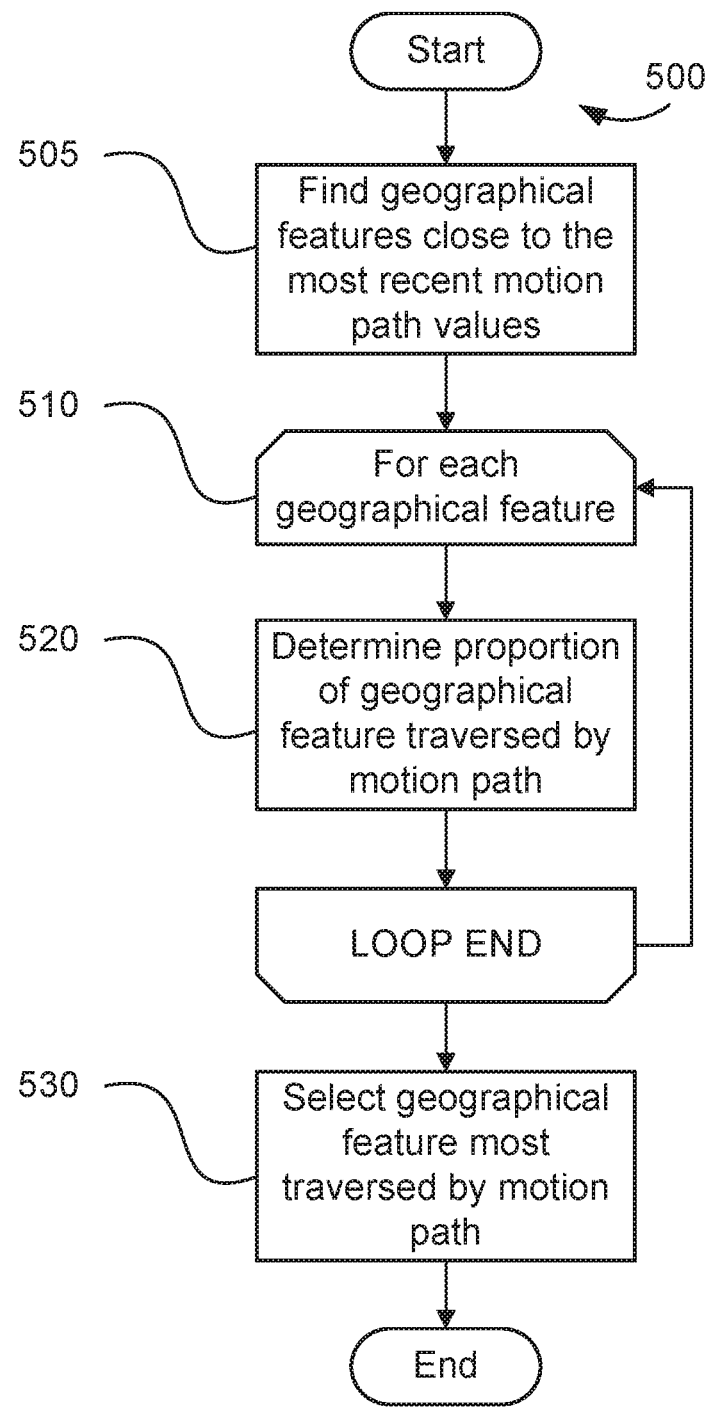
FIG. 5 is a flow diagram showing a method of selecting a geographical feature, as executed in the method of FIG. 2.

The method 500 of selecting a geographical feature, as executed at step 220, will now be described in detail below with reference to FIG. 5. The method 500 may be implemented as one more software code modules of the application program 133 resident in the ROM 160 and being controlled in its execution by the processor 105. Again, the method 500 will be described with reference to the example of FIG. 3.

The method 500 begins at determining step 505, where geographical features are searched on the map near the most recent motion path values, as recorded at step 430. The search can be performed at step 505, for example, by reviewing the last N recorded motion path values and identifying the geographical features that are within a tolerance distance to the motion path value for each recorded motion path value, and then removing repeated found geographical features. The number of recent recorded motion path values N to consider at step 505, and the tolerance distance to the motion path value, may both be configurable according to user/system/application preferences or capabilities (e.g., touch screen sampling rate). Alternatively, the number of recent recorded motion path values N to consider and the tolerance distance to the motion path value may vary in proportion to the size of the finger-touch-area impacted by a user operating the screen 114. In another arrangement, the number of recent recorded motion path values N to consider and the tolerance distance to the motion path value may vary according to the speed in which the motions were performed.

At looping step 510, a loop is executed for each of the geographical features found at step 505. At determining step 520, a calculation is performed to determine the traversed-percentage. The traversed-percentage is the percentage of the length of each found-geographical-feature that has been traversed by the user's finger while each value in the recorded motion path had the found geographical feature within the tolerance distance. For example, if at step 505 there were three geographical-features found, then at 520 the first geographical-feature may have been traversed by the motion path to be within the tolerance distance for 40% of the length of the first geographical-feature, the second geographical-feature for 20%, and the third geographical-feature for 46%. The traversed-percentage of a geographical feature is calculated using all recorded motion path values, regardless of whether a part of the motion path is not visible in the current view of the map.

Figure 11A:
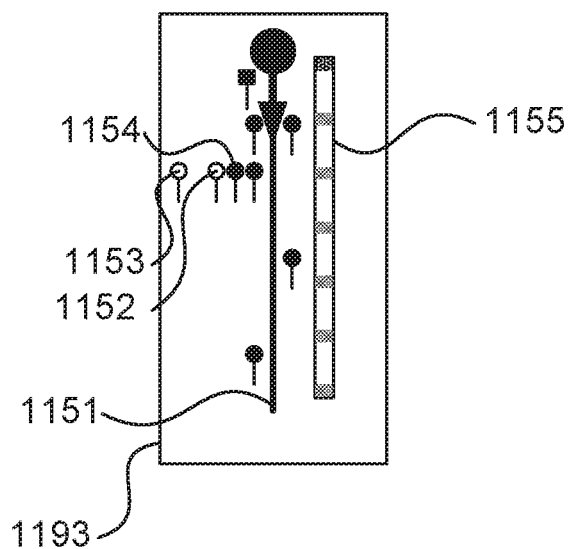
FIG. 11A shows an example map displaying a selected geographical feature with a corresponding dynamic scroll widget, where pins within a predetermined distance to the selected geographical feature may be selected.

Finally, the geographical-feature with the greatest traversed-percentage is returned, which in the above example is the third geographical-feature with a traversal-percentage of 46%. However, in the example shown in FIG. 3, there is only one geographical feature to select and thus that geographical is selected. In another example, FIG. 11A shows a map 1150 where there are more geographical features from which to select. In the example of FIG. 11A, touch point and movement vector 1106, representing the tail-end of the motion path, are nearest to selected geographical feature 1107. The map 1150 of FIG. 11A contains geographical feature 1105, geographical feature 1104, geographical feature 1103 and selected geographical feature 1107. In the example of FIG. 11A, initial touch and movement vector 1106 is used to select selected geographical feature 1107 by selecting the geographical feature whose direction near to the initial touch point matches the direction of the movement vector (e.g., 1106). The selected geographical feature 1107 is the only match to the direction and location of the initial touch and direction vector 1106.

Figure 7:
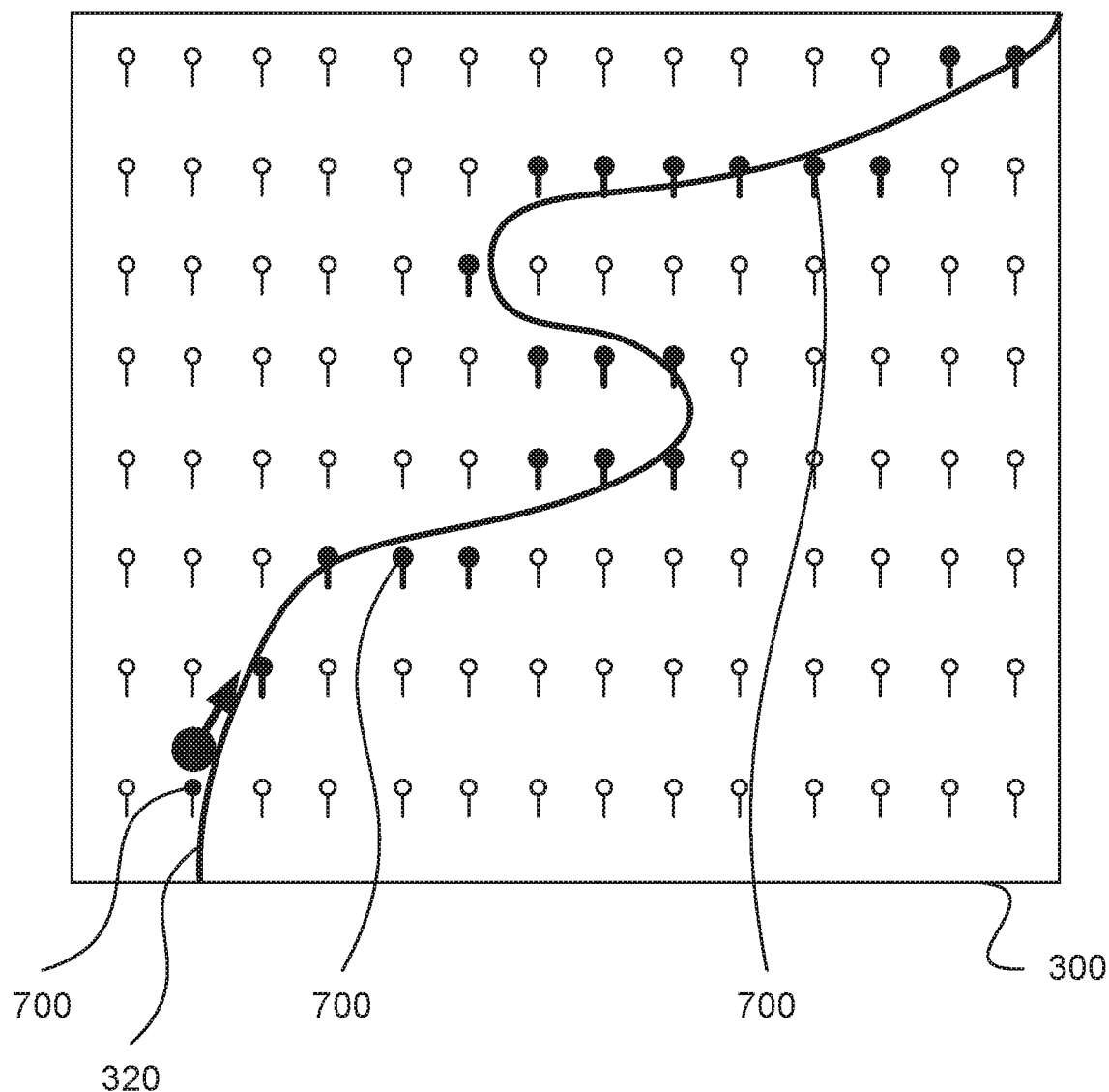
FIG. 7 is a map view of a selected geographical feature and pins representing locations where images were captured.

FIG. 7 extends the example map 300 of FIG. 3 by displaying a view of the map 300 resulting from step 230 described above. In FIG. 7, selected pins (e.g., 700) and others alike on the map 300 shown in FIG. 7 represent the pins for the selected images chosen due to proximity of the pins to the selected geographical feature 320. For example, the proximity may be based on the two dimensional (2D) distance (i.e., from top-down view of the map 300) between the pin and the nearest point of the geographical feature. Alternatively, the proximity may be based on a three dimensional (3D) distance (i.e., including height information) to the geographical feature, where the distance is configurable. In other arrangements, the proximity may be based on distance, camera orientation and camera settings (e.g., zoom, focus distance or focus points), so an image oriented towards the geographical feature may be determined to be more proximal than an image oriented away from the geographical feature; similarly an image facing the geographical feature that is more "zoomed-in" may be more proximal than a "zoomed-out" image also facing the geographical feature, or vice-versa.

Figure 6:
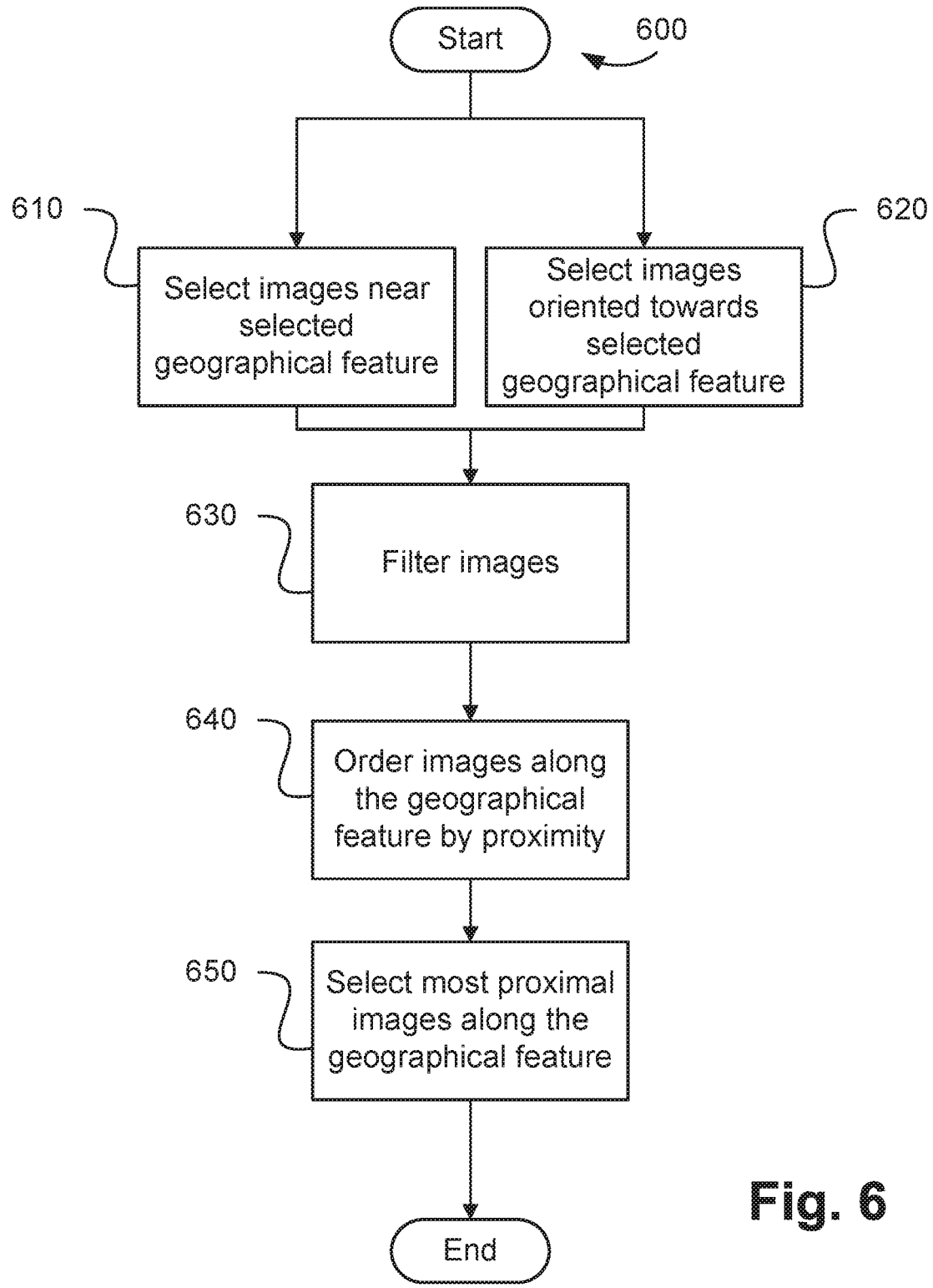
FIG. 6 is a flow diagram showing a method of selecting images for a geographical feature, as executed in the method of FIG. 2.

The method 600 of selecting images for a geographical feature, as executed at step 230, will now be described in detail below with reference to FIG. 6. The method 600 may be implemented as one more software code modules of the application program 133 resident in the ROM 160 and being controlled in its execution by the processor 105. Again, the method 600 will be described with reference to the example of FIG. 3.

The method 600 is used to select images for the geographical feature selected at step 220. The method 600 begins by performing two selecting steps 610 and 620, independently of each other. At step 610, images near the selected-geographical-feature are selected, under execution of the processor 105. The images selected at step 610 may be stored in the RAM 170. At step 620, images oriented towards the selected-geographical-feature, are selected under execution of the processor 105. Again, the images selected at step 620 may be stored in the RAM 170.

At step 610, images within a predetermined distance tolerance to the selected-geographical-feature are selected. The distance tolerance may apply in two dimensional (i.e., a top-down view) or in three dimensional space (i.e., considering height differences).

At step 620, images that may not be within the distance tolerance may still be selected if camera settings stored with each image indicate that the camera used to capture the images was oriented towards the selected-geographical-feature, within an orientation tolerance, by using the bearing information of a compass, for example. The distance tolerance or orientation tolerance may be adjustable according to user/device/application configuration, or resolution of the screen 114 or a display. Further, the distance tolerance or orientation tolerance may be adjustable according to location information recorded in each image.

At filtering step 630, the images from step 610 and step 620 are filtered according to filters that the user of the device 101 may have requested. In one arrangement, images that were captured by a particular camera only, or images, that used a particular lens may be determined using a filter. Further, images that were zoomed-in or zoomed-out or focused at a particular distance, or images that were facing towards or away from the selected geographical features may be determined using a filter. Still further, images that have been tagged as having a particular task tag may be determined using a filter. Any information that can be encoded with the metadata of each image may be used to filter the images at step 630. The images that made it through the filter at step 630 may be stored in the RAM 170 under execution of the processor 105.

At ordering step 640, the images that made it through the filter and were stored at step 630 are ordered by a proximity metric along the length of the geographical-feature selected at step 220. If the selected geographical feature is considered to be constructed from discrete positions, then the images are ordered according to descending proximity for each discrete position. The proximity of an image is determined by a combination of a distance of the image away from the selected geographical feature, whether the image is oriented towards the selected geographical feature, and the level of detail of the geographical feature that can be appreciated by each image. The level of detail of the geographical feature may be dependent on zoom, number of pixels in the image, resolution of the camera used to capture the image, resolution of the lens used to capture the image, and file size of the image.

The method 600 concludes at selecting step 650, where the most proximal images at any particular position in the geographical-feature selected at step 220 are marked as selected under execution of the processor 105. In other arrangements, however, a selection of more than one most-proximal image may be allowed, in which case more than one image may be selected for the selected-geographical-feature at any particular position within the selected-geographical-feature, as will be described in detail below with reference to FIG. 9F.

In other arrangements, the selection of images at steps 610 or 620 may be performed based on other attributes, such as image meta-data, subject tags, density of image pins or a task tag corresponding to a task being performed. For example, the selection of images at steps 610 and 620 may be based on images captured at a particular time, or images captured with a particular camera/lens, or images captured by vehicle mounted cameras. The selection of images at steps 610 and 620 may be based on images captured by a vehicle mounted camera when the vehicle was performing a particular task as recorded with a task tag in the captured images. The selection of images at steps 610 and 620 may be based on a density metric where only one out of three image pins are selected (or otherwise). For example, such particular task tags may be a vehicle harvesting, spraying, irrigating, or trimming, —in which case the tags will correspondingly be a harvest-tag, a spray-tag, an irrigation-tag or a trimming-tag.

Figure 2:
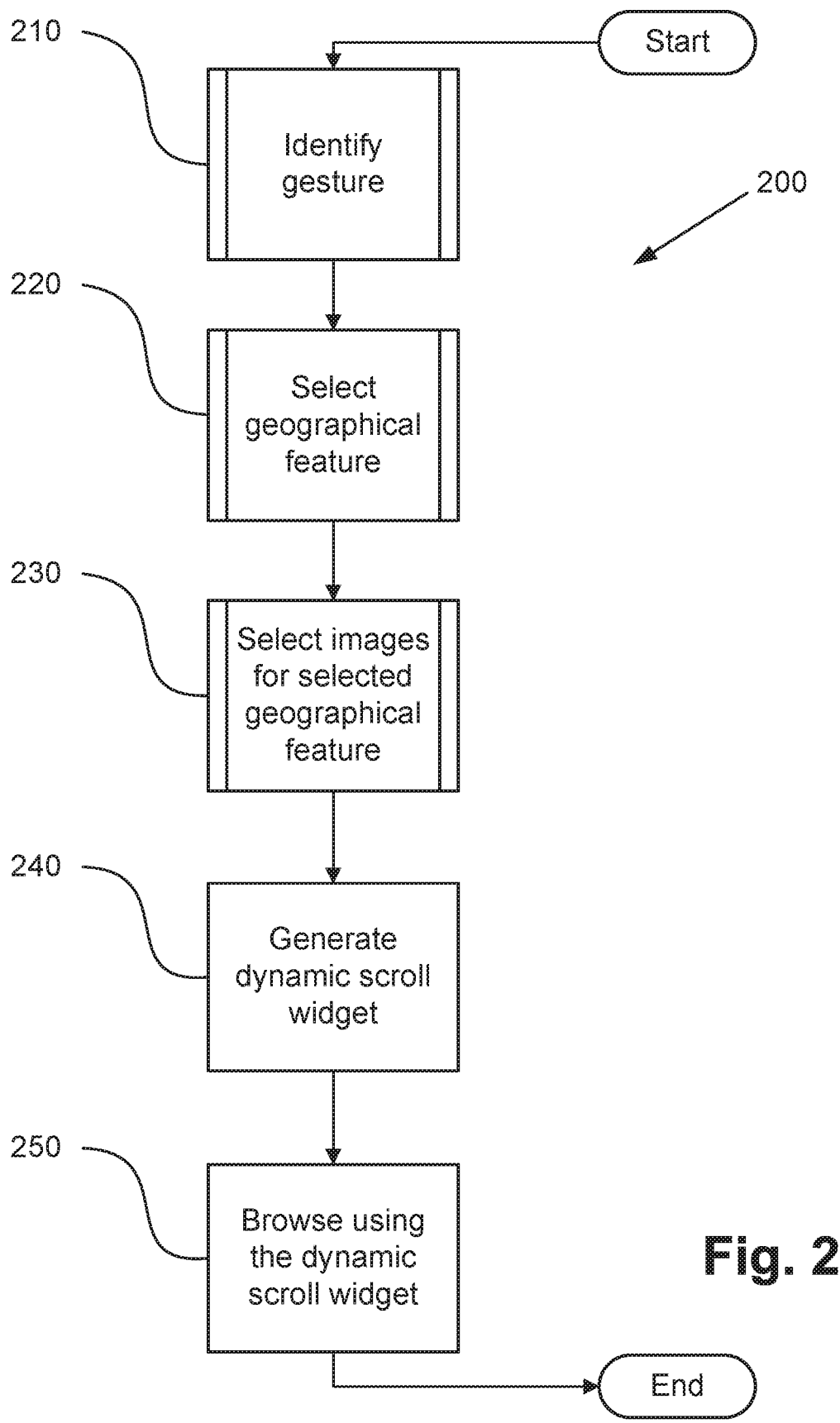
FIG. 2 is a flow diagram showing a method of browsing images on a user interface displaying a map on the device of FIGS. 1A, 1B and 1C.
Figure 8:
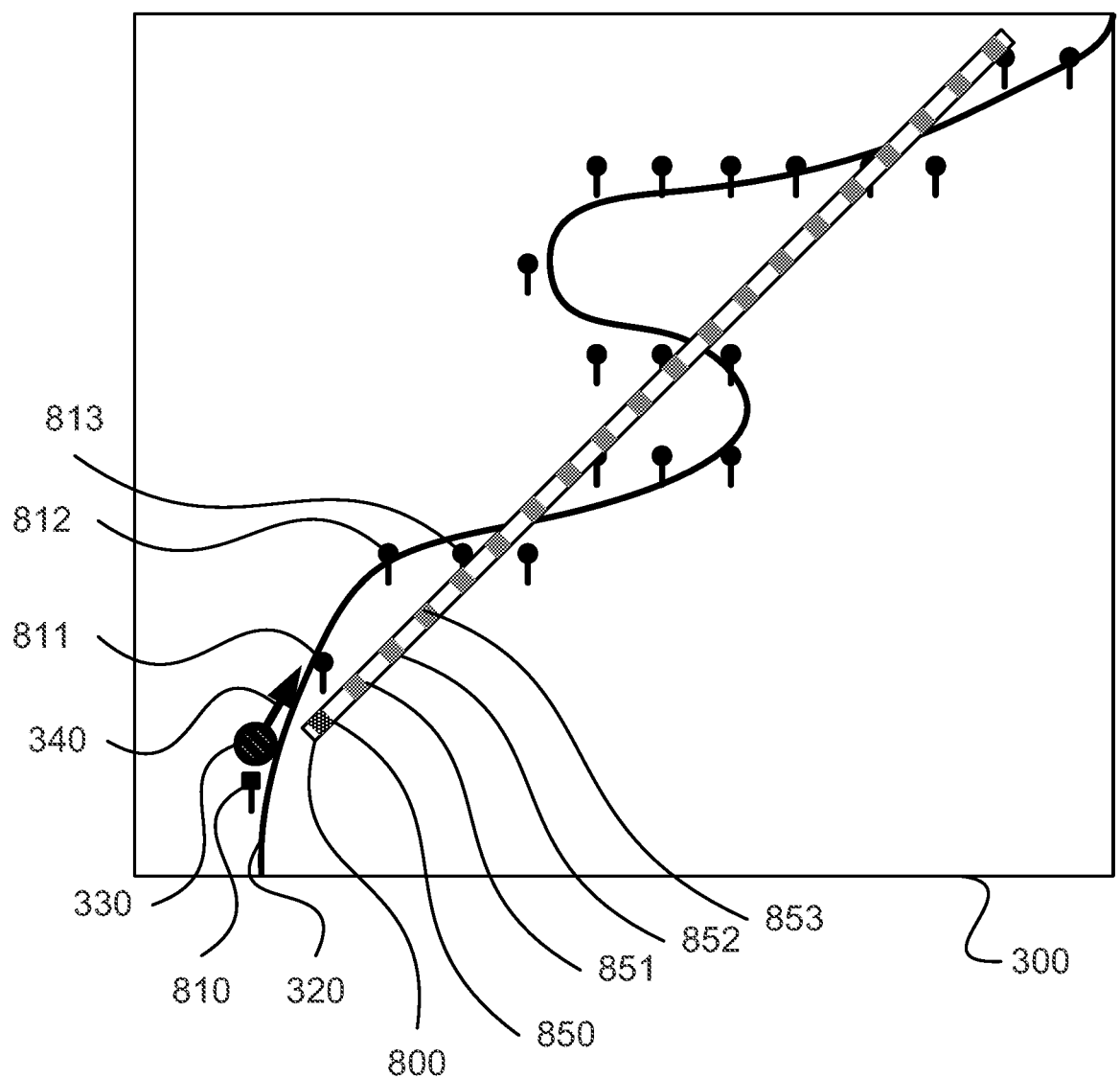
FIG. 8 shows the view of the map of FIG. 3 also displaying a dynamic scroll widget.

FIG. 8 extends the map 300 of FIG. 7 by displaying a view of the map 300 resulting from step 240. As a result of step 240, the view of the map 300 of FIG. 8 shows a dynamic scroll widget 800. In the dynamic scroll widget 800, there are presented several stages (e.g., 851, 852, 853 and 850), each stage corresponding to a pin. The stages (e.g., 851, 852, 853 and 850) may be evenly distributed along the length of the dynamic scroll widget 800. The dynamic scroll widget 800 is shown such that the scroll widget 800 begins at the initial touch point 330 and proceeds in the direction of the movement vector 340. In FIG. 8, the dynamic scroll widget 800 is shown offset for illustration purposes. The dynamic scroll widget 800 is shown on the map 300 until the gesture that initiated the method 200 of FIG. 2 is no longer applicable, such as when the user lifts their finger from the drag gesture after a configurable time to accommodate unintended lift-up cases.

In one arrangement, the length of the dynamic scroll widget 800 is proportional to the selected geographical feature 320 (i.e., corresponding to selected geographical feature 320). In other arrangements, the dynamic scroll widget 800 may be smaller, or larger, as will be described with reference to FIGS. 9A to 11C. In FIG. 8, the dynamic scroll widget 800 is shown to approximately follow the path of the selected geographical feature 320. In other arrangements, the dynamic scroll widget 800 may follow the exact path, as will be described with reference to FIGS. 10A to 10C. In other arrangements, the length of the dynamic scroll widget 800 may span a similar length as the geographical feature 320.

In a further arrangement, each stage of the dynamic scroll widget 800 is displayed with a decoration. The decoration may be a colour, pattern, animation or combination thereof. The decoration corresponds to the value associated with the tag (i.e., task tag or the subject tag, or a combination of both) that is recorded in the image associated with the pin represented by the stage. Further, any space between stages may also be decorated with a transition or blend provided from the decoration of adjacent stages.

In yet a further arrangement, the generation of the dynamic scroll widget may be based on viewing characteristics of the user interface used to display the geographical feature. The length of the dynamic scroll widget 800 may span a similar length as the visible portion of the geographical feature 320 (i.e., in case of the map being zoomed so that the geographical feature is clipped). The selected images for the selected geographical feature 320 may be recalculated and distributed along the dynamic scroll widget 800 as the user zooms and pans the map 300 displayed on the user interface, as will be described in more detail below with reference to FIGS. 9A to 11C.

In the example of FIG. 8, dynamic scroll widget 800 has a current stage 850 that represents the stage that is currently selected in the dynamic scroll widget 800. As the user scrolls through the dynamic scroll widget 800 the current stage is updated accordingly. The user may scroll through the dynamic scroll widget 800 in the direction of movement vector 340, or in a direction in the opposite direction, resulting in the current stage progressing along the stages in the dynamic scroll widget 800, or moving to a prior stage. For example, according to the direction of movement vector 340, the current stage will change from the current stage 850, to stage 851, to stage 852, to stage 853. If the direction of the movement vector 340 were to then become the opposite, then the current stage changes from stage 853 to stage 852, to current stage 851 and finally to current stage 850. In some arrangements, it may be possible to scroll backwards beyond initial touch point 330.

The pins 810, 811, 812 and 813 shown in FIG. 8 represent pins 700 in corresponding locations shown in FIG. 7. As the current stage of the dynamic scroll widget 800 changes, a selected pin corresponding to the current stage changes appearance to identify that the pin is the selected pin corresponding to the current stage—known as the currently selected pin. For example, in FIG. 8 the currently selected pin 810 appears different to selected pin 811, indicating that the currently selected pin 810 is the selected pin corresponding to current stage 850. In the example of FIG. 8, the currently selected pin 810 is drawn to have a square top instead of a round top. In other arrangements, the visual feedback that a selected pin is the currently selected pin may vary, for example, in shape, form, colour, opacity, orientation, shadow, size, visibility state or animation.

The dynamic scroll widget 800 may be visible to the user, or the dynamic scroll widget 800 may be non-visible but still providing the function of the widget 800. In an arrangement where the dynamic scroll widget 800 is non-visible, the user will not know exactly when a stage is selected other than by viewing a corresponding selected pin change in appearance to that of the current selected pin 810. In other arrangements where the dynamic scroll widget 800 is visible, the widget 800 may have a different appearance than the widget 800 shown in FIG. 8. For example, the dynamic scroll widget 800 may have a different shape or contour, and stages may be displayed differently.

In the arrangements described above, the user does not need to continue the drag gesture (i.e., initiated at initial touch point 330 in the direction of the movement vector 340) to follow the contour of the selected geographical feature 320. Instead, the user may continue the drag gesture in a straight line, over the dynamic scroll widget 800 which presents an easier path for the gesture to follow. In other arrangements, the dynamic scroll widget 800 may follow the contour of the selected geographical feature, as will be described below with reference to FIGS. 10A, 10B and 10C.

In some arrangements, the selected pins 700 are associated with a stage on the dynamic scroll widget 800 in an order dependent on the spatial location of each selected pin and each corresponding stage is placed in the dynamic scroll widget 800. As described above, each pin may have one or more images associated with the pin. The pins and associated images may be distributed along the dynamic scroll widget 800 in an order dependent on a spatial location at which each of the images was captured.

In other arrangements, each corresponding stage is placed in the dynamic scroll widget 800 with a spacing independent of the location of the corresponding selected pin. The independent spacing may or may not be evenly distributed. For example, FIG. 8 shows a stage 851 corresponding to selected pin 811, a stage 852 corresponding to selected pin 812, and a stage 853 corresponding to a selected pin 813. In FIG. 8, the remaining selected pins and stages are associated accordingly.

In other arrangements, the selected pins 700 may be associated with a stage on the dynamic scroll widget 800 in an order dependent on a property other than the spatial location of each selected pin. For example, the order of the selected pins 700 with a stage on the dynamic scroll widget 800 may be dependent on the image (i.e., the image for which the pin is selected) properties such as timestamp, file size, camera attributes, or task-based tags.

As a further aspect, a preview may be displayed on the map 300 to represent the image of the current selected pin, as will be described below with reference to FIGS. 11A, 11B and 11C.

FIGS. 9A to 11C each show example maps displaying a selected geographical feature and corresponding dynamic scroll widget. In the examples in FIGS. 9A to 11C, the selected geographical features are drawn as straight lines for illustration purposes. However, the selected geographical features are not limited to being a straight line. Additionally, in the examples in FIGS. 9C to 11C the dynamic scroll widgets are drawn to the side of the selected geographical features for illustration purposes. However, the dynamic scroll widgets may be on top of the selected geographical feature.

Figure 9A:
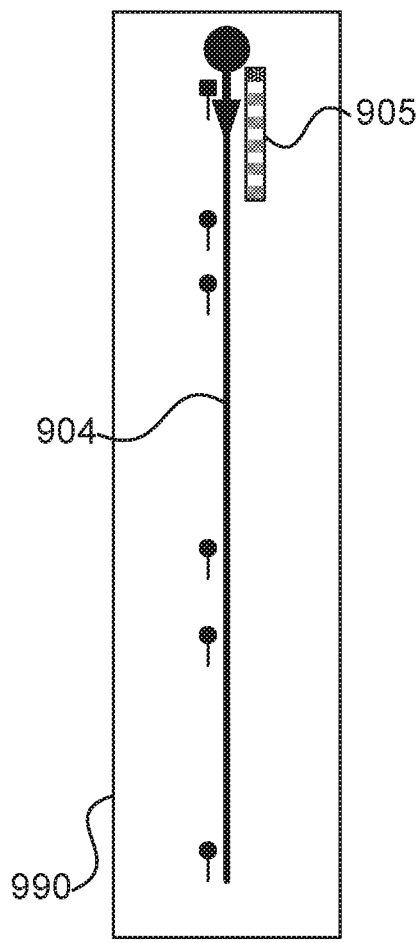
FIG. 9A shows an example map displaying a selected geographical feature with a corresponding dynamic scroll widget, where the geographical feature can be viewed fully within the map.

FIG. 9A shows an example map 990 displaying a selected geographical feature 904 with a corresponding dynamic scroll widget 905, where the geographical feature 904 can be viewed fully within the map 990.

Figure 9B:
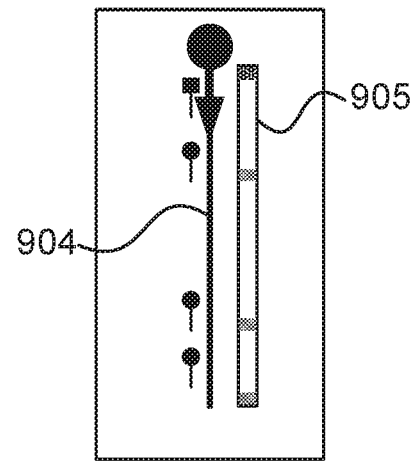
FIG. 9B shows an example map displaying a selected geographical feature with a corresponding dynamic scroll widget, where the dynamic scroll widget is the same length as the geographical feature.
Figure 9C:
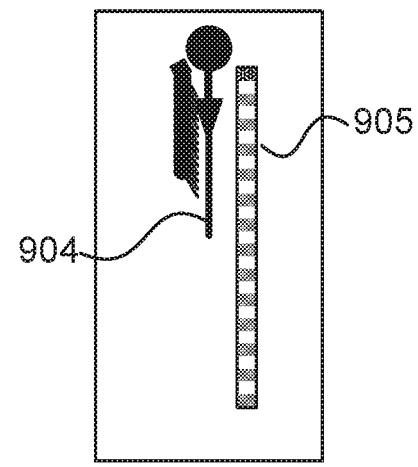
FIG. 9C shows an example map displaying a selected geographical feature with a corresponding dynamic scroll widget, where the dynamic scroll widget is longer than the geographical feature.

In the example of FIG. 9A, the length of the selected geographical feature 904 may be divided by the number of selected pins. If a result of the length of the selected geographical feature 904 divided by the number of selected pins is significantly greater than a predetermined threshold, then the length of the dynamic scroll widget 905 may be made less than the length of the geographical feature 904 as shown in FIG. 9A. If the result of the length of the selected geographical feature 904 divided by the number of selected pins is near the predetermined threshold, then the dynamic scroll widget 905 may be made the same length as the geographical feature 904, as shown in FIG. 9B. If the result of the length of the selected geographical feature 904 divided by the number of selected pins is significantly less than the threshold then the dynamic scroll widget 905 may be made longer, as shown in FIG. 9C.

The value of the predetermined threshold may be dependent, for example, on user preferences, system preferences and state, application preferences and state, map preferences and state, density of stages in the dynamic scroll widget 905, screen resolution, touch-sensor resolution. For example, a touch device with low touch-sensor resolution may require a threshold that allows for a greater spacing between stages in the dynamic scroll widget 905 to compensate for the touch-sensor resolution; thus ensuring that the user can accurately and responsively scroll the dynamic scroll widget.

Figure 10A:
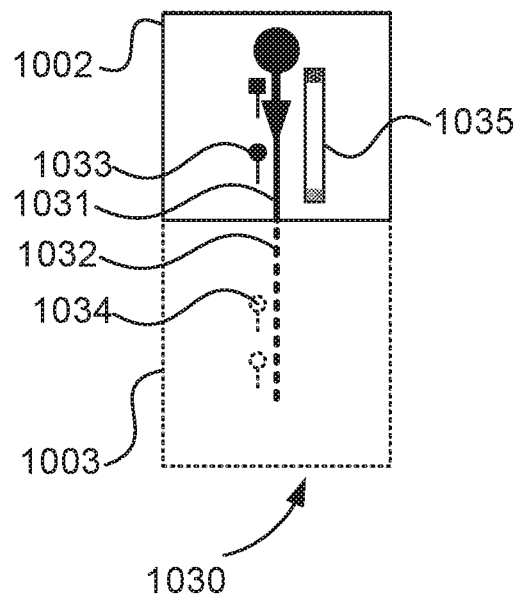
FIG. 10A shows an example map comprising a visible-map-portion and a non-visible-map-portion.
Figure 10B:
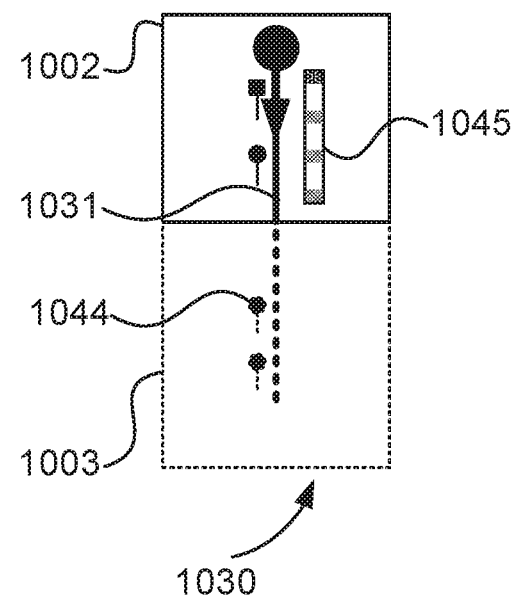
FIG. 10B shows an example map where a dynamic scroll widget has been configured to include selected pins that are in a non-visible-map-portion of the map.

An example of a map state that is considered in the determination of the value of the predetermined threshold is shown in FIGS. 10A and 10B where the map zoom is insufficient to view the entire selected geographical feature, as will be described below. In the example of FIG. 9B, the stages shown in the dynamic scroll widget 905 are not evenly distributed.

FIG. 10A shows the relationship between a selected geographical feature 1031 and dynamic scroll widget 1035 when viewed across a visible-map-portion 1002 and a non-visible-map-portion 1003 of a map 1030. The visible-map-portion 1002 and the non-visible-map-portion 1003 form a map 1030 where the selected geographical feature 1031 is present. In the example of FIG. 10A, a user has zoomed and panned the view of the map 1030 such that one portion 1002 remains visible and the other portion 1003 is non-visible. In FIG. 10A, part of the selected geographical feature 1031 is an off-screen-portion 1032 in the non-visible-map-portion 1003.

In the example of FIG. 10A, pins which are located in the non-visible-map-portion 1003 are not able to be selected. For example, non-selected pin 1034 is in non-visible-map-portion 1003 and is hence not a selected pin, whereas selected pin 1033 is in the visible-map-portion 1002 and is thus selected. Since non-selected pin 1034 and other pins in the non-visible-map-portion 1003 are not selected, non-selected pin 1034 and the other pins in the non-visible-map-portion 1003 do not have a corresponding stage in the dynamic scroll widget 1035.

FIG. 10B shows an example where a dynamic scroll widget 1045 has been configured to include selected pins 1044 that are in the non-visible-map-portion 1003 according to a different gesture being performed, or map/application/user/system preferences or state. Correspondingly, dynamic scroll widget 1045, when compared to the dynamic scroll widget 1035, now contains two extra stages, corresponding to selected pins located in the non-visible-map-portion 1003.

FIG. 11A shows a map 1193 displaying a selected geographical feature 1151 with a corresponding dynamic scroll widget 1155. The map 1193 also shows several selected pins (e.g., pin 1154) and non-selected pins (e.g., 1152 and 1153). In the arrangement of FIG. 11A, pins within a predetermined distance to the selected geographical feature 1151 may be selected, such that non-selected pin 1152 and non-selected pin 1153 are outside the predetermined distance and have not been selected and selected pin 1154 is within the predetermined distance and has been selected.

Figure 11B:
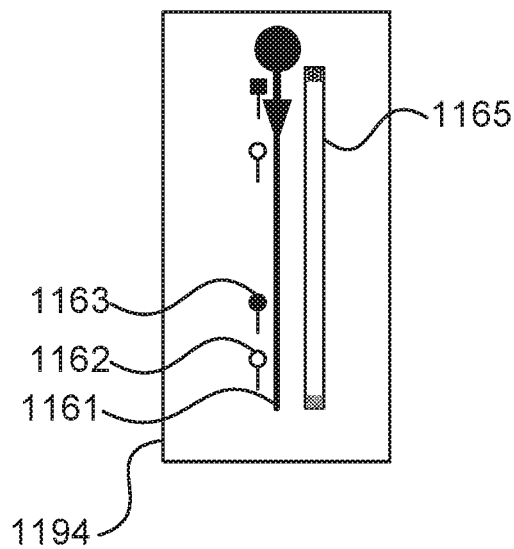
FIG. 11B shows an example map displaying a selected geographical feature with a corresponding dynamic scroll widget, where pins having a corresponding image with a particular property may be selected.

FIG. 11B shows an example map 1194 displaying a selected geographical feature 1161 with a corresponding dynamic scroll widget 1165. The map 1194 also shows several selected pins (e.g., pin 1163) and non-selected pins (e.g., pin 1162). In the arrangement of FIG. 11B, pins having a corresponding image with a particular property are selected. The property may be, for example, image metadata, time/date, task tag, camera settings, subject tags, camera properties, weather, barometer reading, and altitude. In the example shown in FIG. 11B, only two pins are selected pins and thus, dynamic scroll widget 1165 only contains two stages corresponding to the selected pins selected for selected geographical feature 1161.

Figure 11C:
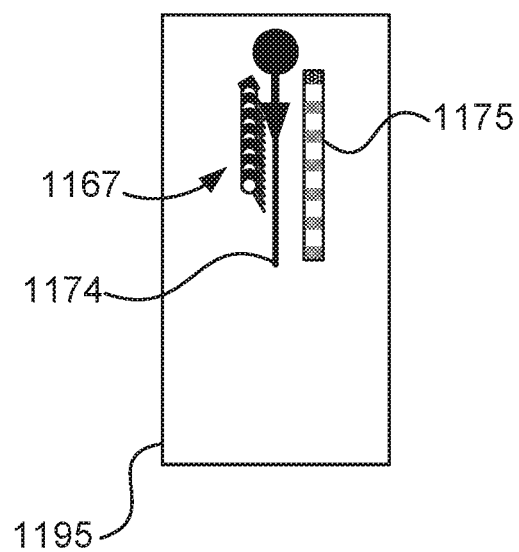
FIG. 11C shows another example map displaying a selected geographical feature with a corresponding dynamic scroll widget.

FIG. 11C shows an example map 1195 displaying a selected geographical feature 1174 with a corresponding dynamic scroll widget 1175. Several selected and non-selected pins are shown at 1167 in the map 1195. In another arrangement the dynamic scroll widget 1175 may not be enlarged (e.g., lengthened as was the case in the example of FIG. 9C) to accommodate a high density of stages, in response to a configuration or setting. Instead, a sub-set of the pins at 1167 may be selected to reduce the density of the stages. The configuration or setting may be selected according to the gesture detected at step 210; one gesture such as a drag may be used to configure the dynamic scroll widget to be enlargeable, another gesture such as a long-tap-and-drag may be used to configure the scroll widget to be non-enlargeable; other examples of gestures are possible.

In one arrangement, the device 101 may be configured so that the dynamic scroll widget may not be longer than the selected geographical feature and the density of the stages may need to be reduced. Where the stages may need to be reduced, all the required stages may not be accommodated within the dynamic scroll widget, and some pins may need to be prevented from being selected. In determining which pins not to select when reducing the density of the stages, image metadata, camera settings, and task tags, for example, may be considered. For example, a dense placement of pins of images that were captured with a lens zoomed-out (small focal length) may not need all of the closely-located zoomed-out images to be selected due to image overlap, so adjacent zoomed-out images may be skipped. In another example, for a vehicle mounted camera, there may be overlap between images depending on the vehicle speed, in which case certain images may be skipped as it is likely that there is significant overlap (e.g., when the vehicle is stationary). Further, on a vehicle mounted camera, a task tag may indicate that certain images can be skipped because the value associated with the task tag may result in an image being less preferable over another. In one example, a pesticide spraying task tag can have a value indicating the amount of spray being sprayed. A high value for the pesticide spraying task tag then results in an image with low visibility while a lower value for the pesticide spraying task tag results in an image with higher visibility Thus when it is necessary to reduce the stages, preference can be given to images that are more visible.

In all the examples in FIGS. 9A to 11C, the arrangement of the selected geographical feature and the dynamic scroll widget may be dependent on properties of the selected geographical feature including, for example, length, shape, width, type, height, and physical characteristics (e.g., sand, mud, hill, and infrastructure). The arrangement of the selected geographical feature and the dynamic scroll widget may also be dependent on the map, zoom level, scale and rotation. The arrangement of the selected geographical feature and the dynamic scroll widget may also be dependent on resolution of the device 101 upon which the described methods are being executed, touch screen or user input resolution. The arrangement of the selected geographical feature and the dynamic scroll widget may also be dependent on, for example, coarseness of a user's finger tap, user preferences, number of pins visible in the map, number of pins not visible in the map, number of pins selected or non-selected, density of pins in a map, and density of pins selected by selecting the geographical feature.

Figure 12A:
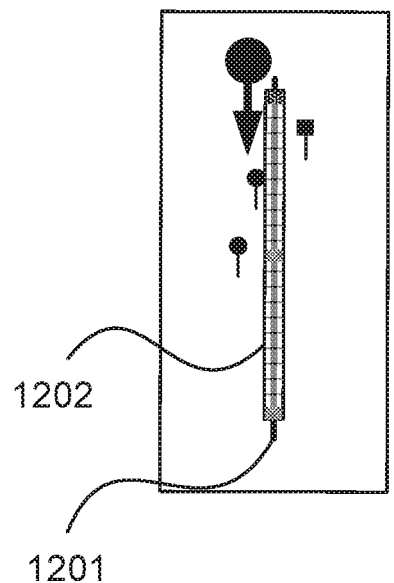
FIG. 12A shows a straight-line selected geographical feature and a straight-line dynamic scroll widget.

In another arrangement, a dynamic scroll widget may follow the same path as a selected geographical feature so that linear properties of the geographical feature affects the shape or of the dynamic scroll widget. As an example, FIG. 12A shows a selected geographical feature 1201 which is in a straight-line and a straight-line dynamic scroll widget 1202 is displayed on top of the geographical feature 1201.

Figure 12B:
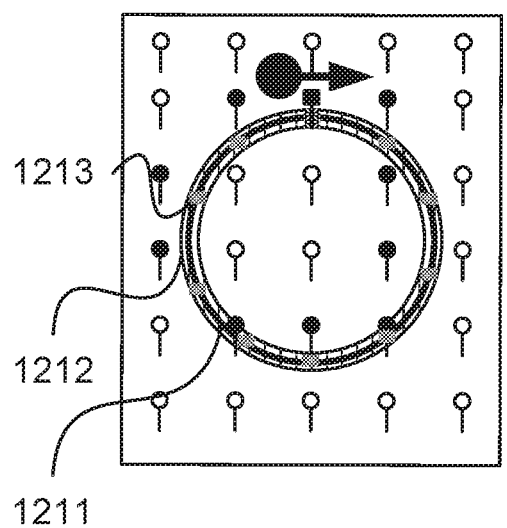
FIG. 12B shows a circular selected geographical feature and a circular dynamic scroll widget.

In another example, FIG. 12B shows a selected geographical feature 1211 which is circular. A circular dynamic scroll widget 1212 is displayed on top of the selected geographical feature 1211. The dynamic scroll widget 1212 also contains stages 1213.

Figure 13:
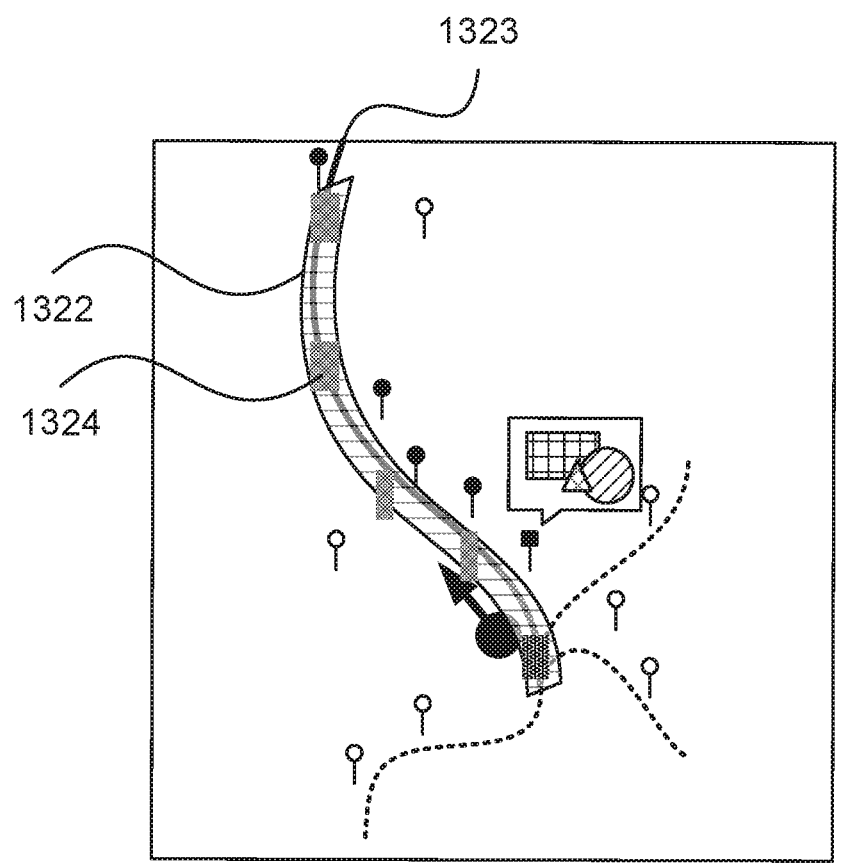
FIG. 13 shows an irregularly shaped selected geographical feature and a irregularly shaped dynamic scroll widget.

In still another example, as shown in FIG. 13, the selected geographical feature 1323 is irregularly shaped, and consequently a dynamic scroll widget 1322, which is also irregularly shaped, follows the path of the selected geographical feature 1323. For illustration purposes, stages of the dynamic scroll widget 1322 are shown as gray rectangles (i.e., 1324) corresponding to selected pins. As shown in FIG. 8, the path of the dynamic scroll widget may follow an approximation of the selected geographical feature.

In one arrangement, a preview of the image corresponding to the currently selected pin may be displayed. The preview may contain the image and additional metadata about the image such as but not limited to timestamp. In FIGS. 14A to 15B, there is no dynamic scroll widget shown, as described above, the dynamic scroll widget may be visible or non-visible. However, the dynamic scroll widget is present in function.

Figure 14A:
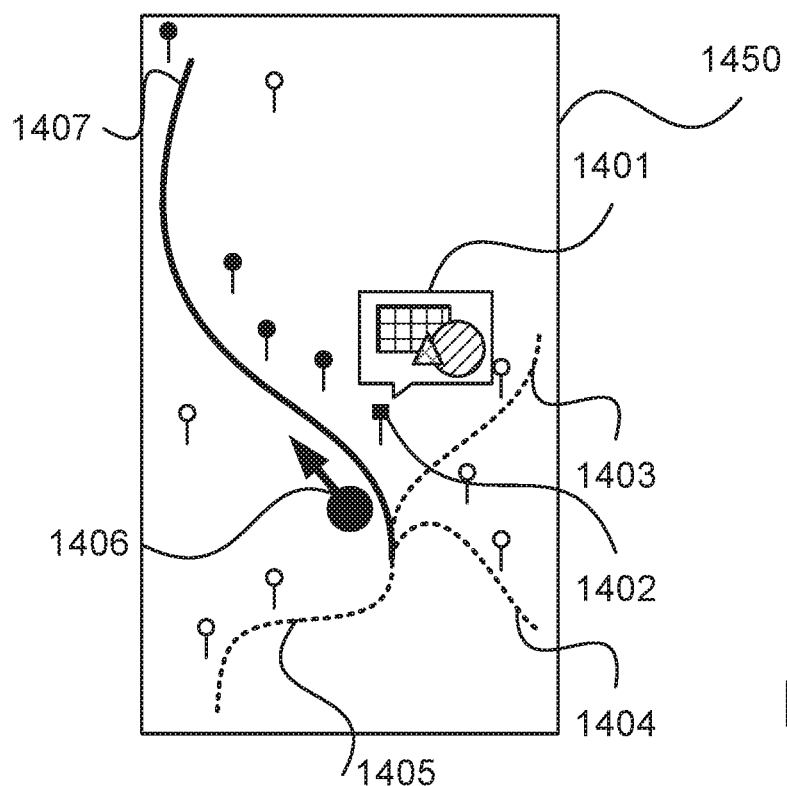
FIG. 14A shows a map with a currently selected pin and preview displaying an image represented by the currently selected pin.

FIG. 14A shows the map 1450 with a currently selected pin 1402 and preview 1401 displaying an image represented by the currently selected pin 1402. The preview 1401 is displayed adjacent to the pin 1402 at a location that is convenient and avoids occluding other objects. Other geographical features 1403, 1404 and 1405 available for selection to the user are shown in FIG. 14A. FIG. 14A also shows a touch point along with a movement vector 1406 initiated by the user that resulted in the geographical feature 1407 being selected in the first place due to a match in gesture rules as described with reference to FIGS. 4 and 5.

Figure 14B:
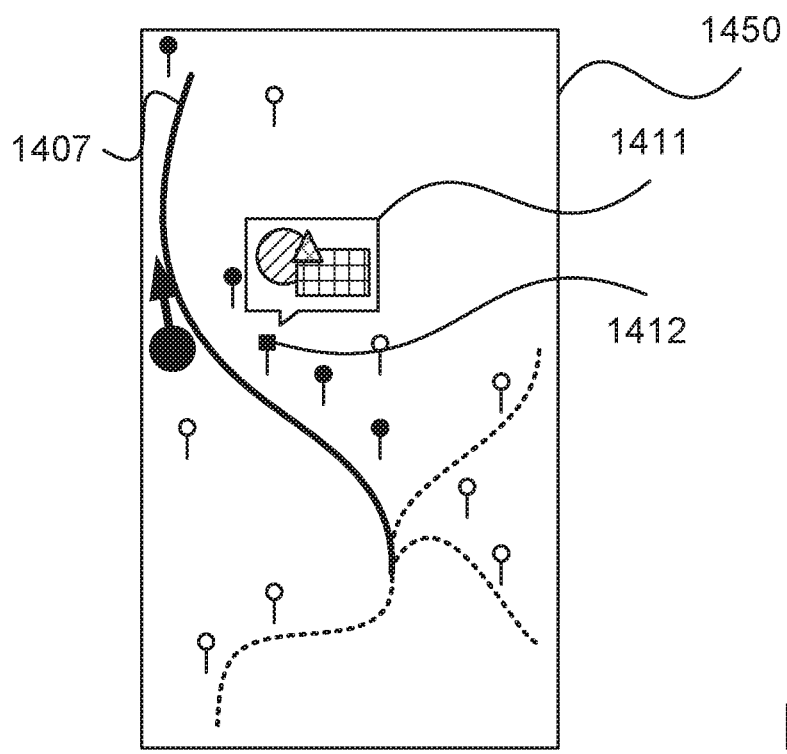
FIG. 14B shows the map of FIG. 14A after a user has scrolled a non-visible dynamic scroll widget further along a selected geographical feature.

FIG. 14B shows the map 1450 after a user has scrolled a non-visible dynamic scroll widget further along the selected geographical feature 1407. In the example of FIG. 14B, a currently selected point is selected point 1412 and adjacent to the currently selected point 1412 is preview 1411 as shown.

Figure 15A:
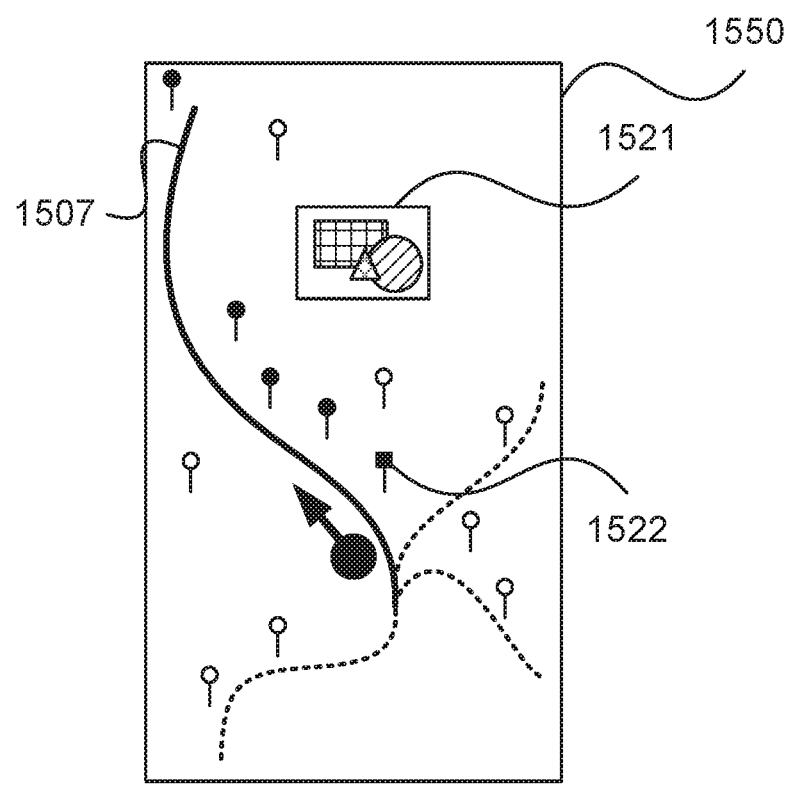
FIG. 15A shows a preview displayed at a fixed location on the map of FIG. 14A.
Figure 15B:
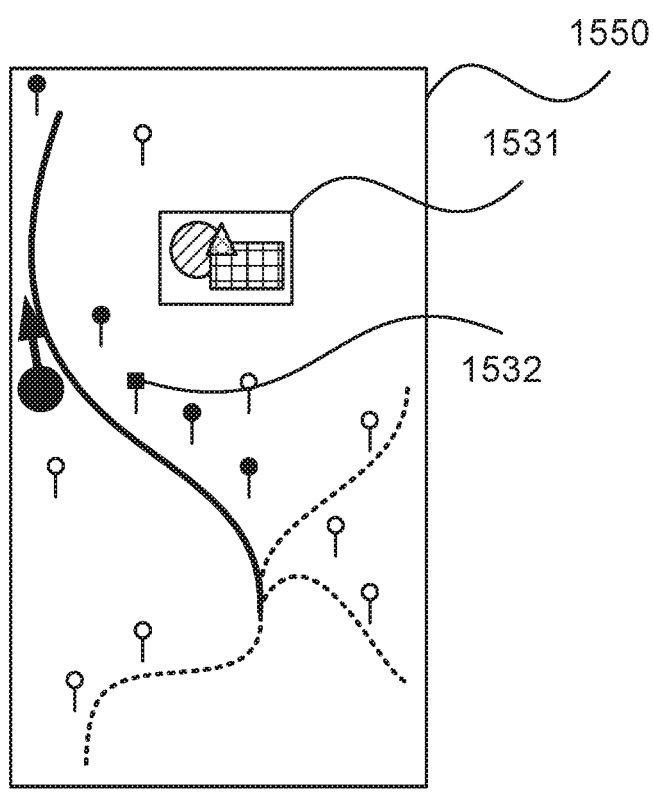
FIG. 15B shows another preview displayed at a fixed location on the map of FIG. 14A.

In contrast, in FIG. 15A, preview 1521 is instead shown at a fixed location which is proximal to the selected geographical feature 1507 and does not occlude other objects. The location of the preview 1521 is fixed while the user scrolls through the non-visible dynamic scroll widget, and the location of the preview 1521 may change the next time the dynamic scroll widget is activated for the selected geographical feature 1507. The preview 1521 is shown for the currently selected pin 1522. As shown in FIG. 15B, once the user has scrolled the non-visible dynamic scroll widget, currently selected pin 1532 is selected and a corresponding preview 1531 is shown in the same fixed location as the preview 1521.

The content of a preview (e.g., preview 1521) may be the image corresponding to the currently selected pin. Alternatively, the content of the preview 1521 may also display extra information such as, for example, image metadata, timestamp of when the image was captured, subject data, task data, and summary data.

Figure 16A:
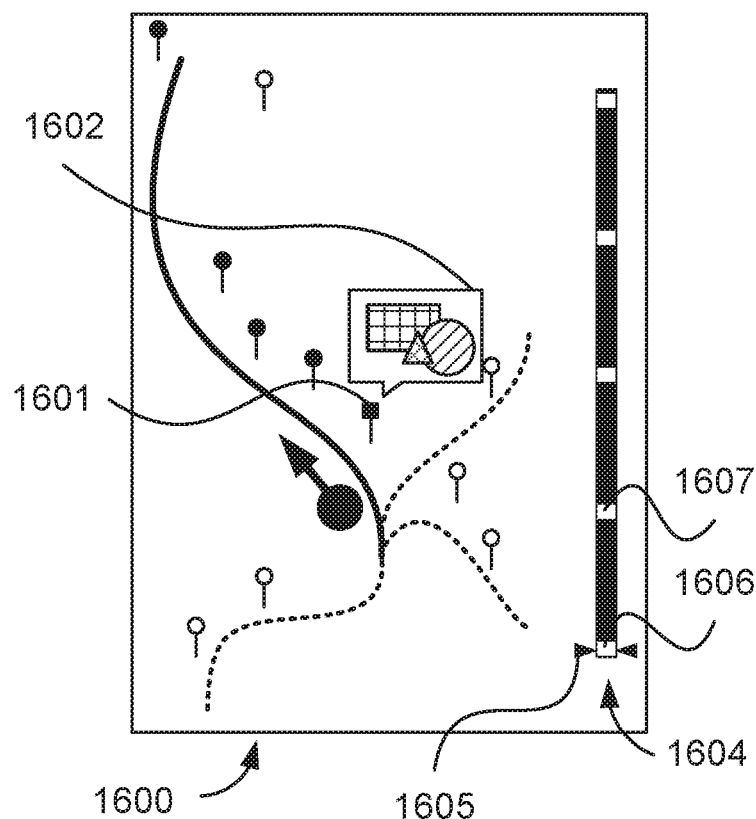
FIG. 16A shows a first panel of a sequence of three panels.
Figure 16B:
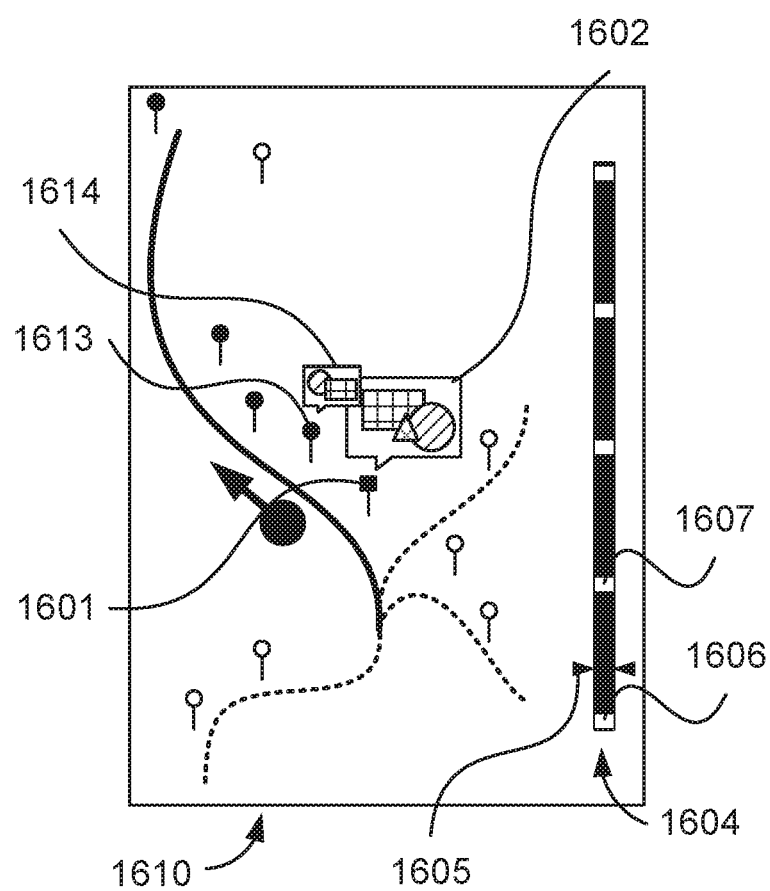
FIG. 16B shows a second panel of the sequence of three panels.
Figure 17:
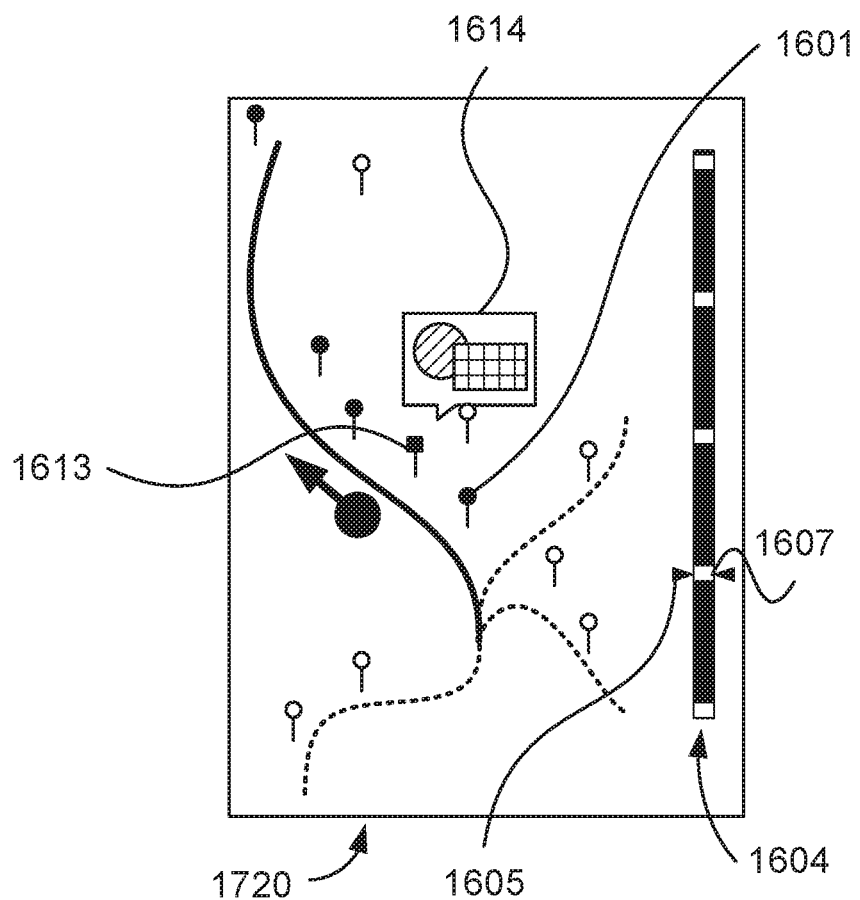
FIG. 17 shows a third panel of the sequence of three panels.

FIGS. 16A, 16B and 17 each show a panel of a sequence of three panels. First panel 1600 of FIG. 16A shows an initial state, a second panel 1610 of FIG. 16B shows an intermediate state, and panel 1720 of FIG. 17 shows a final state. The states shown in FIGS. 16A, 16B and 17 illustrate a transition effect of a preview 1602 as the currently selected pin changes. In the first panel 1600, currently selected pin 1601 has a corresponding preview 1602 displayed. The second panel 1610 shows the transition when the currently selected pin is about to change from the currently selected pin 1601 to selected pin 1613, in which preview 1602 is transitioning to reduce in size while preview 1614 is enlarging. The preview 1602 corresponds to the preview of the image for currently selected pin 1601, likewise preview 1614 corresponds to the preview of the image for selected pin 1613. The third panel 1720 shows the completed transition from the former currently selected pin 1601 to new currently selected pin 1613, such that the selected pin 1601 no longer has a preview window visible, while the currently selected pin 1613 has a corresponding preview window 1614 fully visible. In other arrangements, the transition may be represented, for example, by enlarge/shrink, fade-in/out, colour changing, and animations.

With reference to FIGS. 16A, 16B, 17, 18A and 18B, in another arrangement, a progress bar may be displayed to represent the current stage of a dynamic scroll widget. The current stage of the dynamic scroll widget may be linearly related to the current position of a gesture with respect to a displayed geographical feature. When the progress bar is not displayed and the dynamic scroll widget is displayed, the dynamic scroll widget may adopt features of the progress bar. The dynamic scroll widget may operate without being visible to the user irrespective of whether the progress bar is visible or not.

The states of FIGS. 16A, 16B and 17 illustrate a transition effect of a progress bar 1604 as the progress bar 1604 moves from a first stage 1606 to a second stage 1607. The progress bar 1604 presents a progress indicator on a current scroll position of the non-visible dynamic scroll widget. The progress bar 1604 also has stages matching the stages in the dynamic scroll widget.

As seen in FIG. 16A, the progress bar 1604 has a current position indicator 1605 indicating a current position. In FIG. 16A, the currently selected pin 1601 is the first selected pin. Consequently, the current position indicator 1605 is indicating the current scroll position of the non-visible dynamic scroll widget to be the stage corresponding to the first stage 1606.

As seen in FIG. 16B, the second panel 1610 represents the transition stage between two stages of the non-visible dynamic scroll widget, as illustrated by preview 1602 and preview 1614. The preview 1602 and the preview 1614 are both visible in the panel 1610 of FIG. 16B, however the preview 1614 is smaller than the preview 1602. Consequently, the current position indicator 1605 is shown closer to the first stage 1606 than second stage 1607. The selected pin 1601 is the currently selected pin and selected pin 1613 is not yet the currently selected pin.

As seen in FIG. 17, the third panel 1720 shows the progress bar 1604 when the current position indicator 1605 has moved to the second stage 1607 according to the currently selected pin now being the second selected pin 1613, rather than the first selected pin 1601.

Figure 18A:
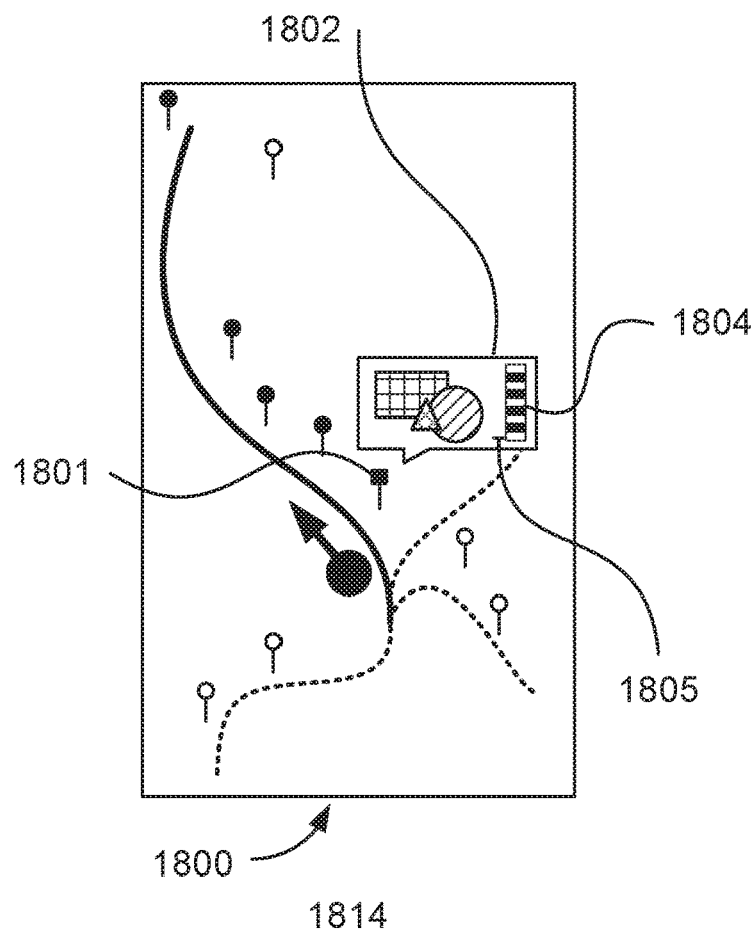
FIG. 18A shows a progress bar displayed within a preview.
Figure 18B:
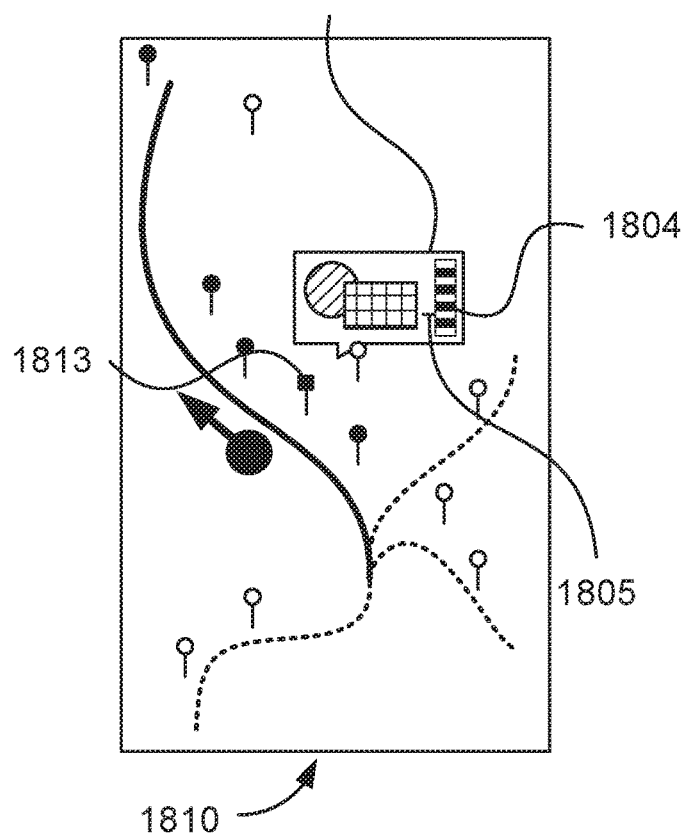
FIG. 18B shows a progress bar displayed within another preview.

In another arrangement, as shown in FIG. 18A, the progress bar 1804 is displayed within the preview 1802. The current position indicator 1805 is shown to indicate the current position of progress. In FIG. 18A, the current position indicator 1805 is at the first stage of the progress bar 1804 since the currently selected pin is the first selected pin 1801. Similarly, FIG. 18B shows the progress bar 1804 displayed within the preview 1814, with the current position indicator 1805 being at the second stage since the currently selected pin is the second selected pin 1813.

In other arrangements, the progress bar 1804 may have a different orientation, different dimensions, a different physical shape or different placement than that shown in FIG. 16A, 16B, 17, 18A or 18B.

In other arrangements, as shown in FIGS. 19A, 19B, 20A and 20B, a user may select an additional geographical feature or switch to another geographical feature within a gesture identified at step 210.

Figure 19A:
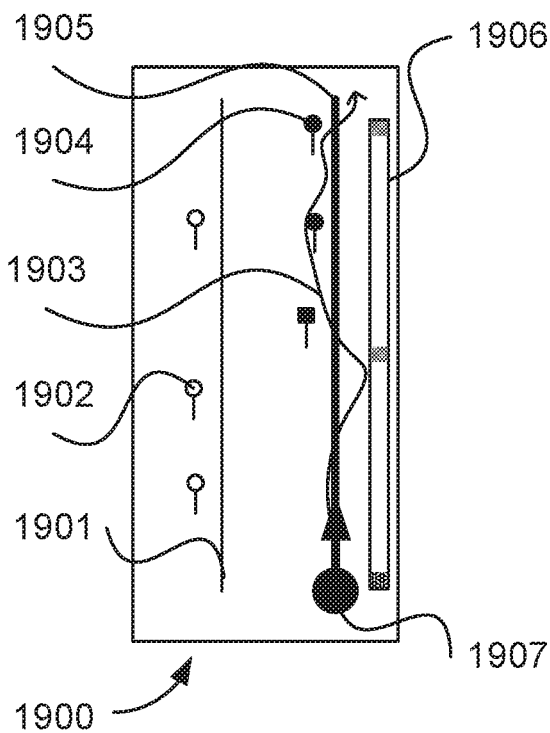
FIG. 19A shows an example map comprising two geographical features.
Figure 19B:
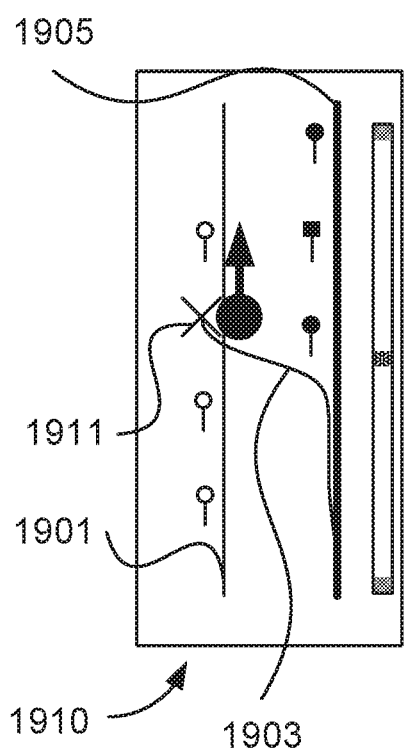
FIG. 19B shows the map of FIG. 19A where a motion path crosses a non-selected geographical feature.

FIG. 19A shows an example map 1900 comprising two geographical features in the form of a selected geographical feature 1905 and a non-selected geographical feature 1901. The map 1900 also comprises a dynamic scroll widget 1906, a touch-point and movement-vector 1907, a set of pins (e.g., 1902), a set of selected pins (e.g., 1904) and a motion path 1903. In the example of FIG. 19A, the user has selected the selected geographical feature 1905 with their touch-point and movement-vector 1907. The pins 1904 are selected in the map 1900 as the pins 1904 are most proximal to the selected geographical feature 1905. The dynamic scroll widget 1906 is shown next to the selected geographical feature 1905 for illustration purposes. The dynamic scroll widget 1906 shows three stages corresponding to the three selected pins (e.g., 1904) in the map 1900. In the example map 1900, the motion path 1903 shows the path that the touch-point and movement-vector 1907 will traverse according to the gesture of the user. The motion path 1903 shown in FIG. 19A does not cross over or touch the non-selected geographical feature 1901. However, in one arrangement, if the motion path 1903 were to be different and actually cross or touch the non-selected geographical feature 1901, as shown in FIG. 19B, then the non-selected geographical feature 1901 may also be selected at cross-over point 1911.

In one arrangement, the crossing or touching of a further geographical feature by the motion of the user may result in either the further geographical feature also being selected, or whether the selected geographical feature changes to the further geographical feature.

Figure 20A:
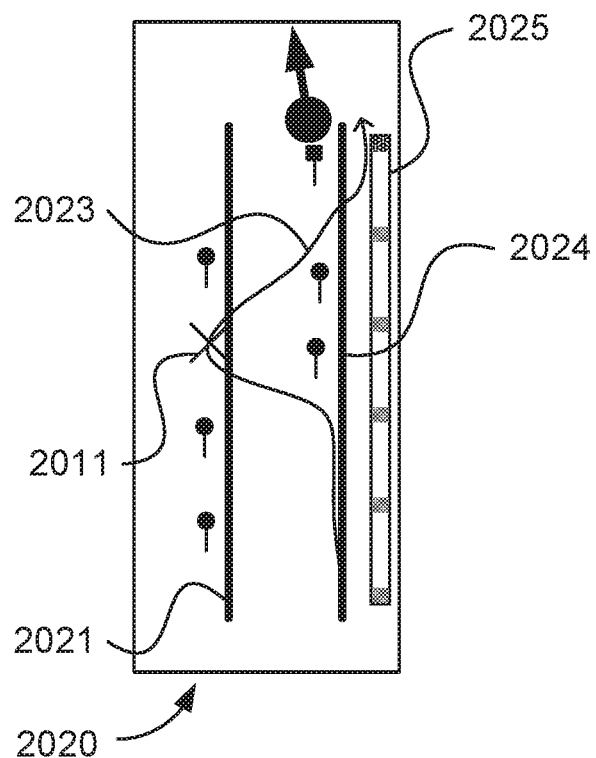
FIG. 20A shows an example map where a motion path crosses over a geographical feature and crosses back towards an original selected geographical feature.

FIG. 20A shows an example map 2020 where a motion path 2023 crosses over a geographical feature 2021 and crosses back towards an original selected geographical feature 2024. Such a cross and cross back condition by the motion path 2023 as shown in FIG. 20A may be detected and the geographical feature 2021 may be selected. As shown in FIG. 20A, as a result of the detection of the cross and cross back condition, the pins proximal to both the selected geographical feature 2021 and original selected geographical feature 2024 are selected and shown as stages in the dynamic scroll widget 2025.

Figure 20B:
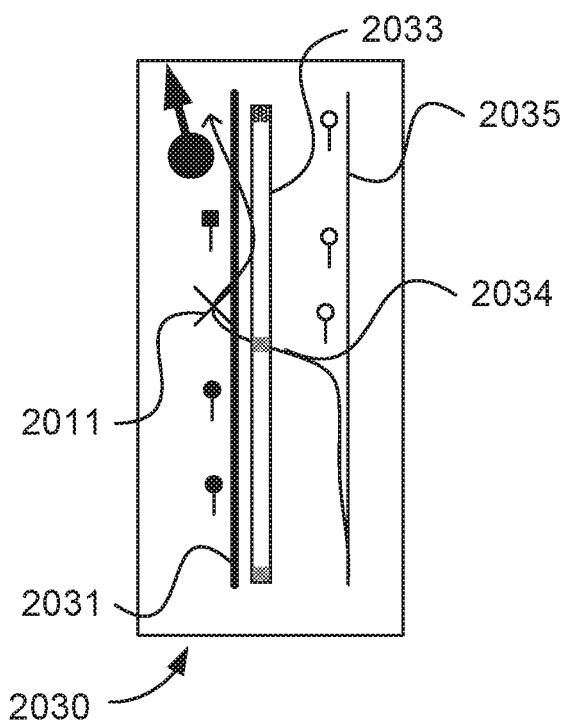
FIG. 20B shows an example map where a motion path crosses over a geographical feature and does not cross back towards an original selected geographical feature.

FIG. 20B shows an example map 2030 where a motion path 2034 crosses over a geographical feature 2031 and does not cross back towards an original selected geographical feature 2035. Such a cross and no-cross-back condition by the motion path 2034 may be detected and the selected geographical feature may be changed from the original geographical feature 2035 to the geographical feature 2031. As shown in FIG. 20B, as a result of the detection of the cross and no-cross back condition, dynamic scroll widget 2033 is now shown with three stages corresponding to the selected pins proximal to the selected geographical feature 2031.

Any suitable method of identifying whether a line corresponding to a motion path intersects another line (e.g., a geographical feature) may be used in the arrangements shown in FIGS. 19A, 19B, 20A and 20B.

In another arrangement, which will now be described with reference to FIGS. 21A, 21B and 22, a user may browse through images in a temporal dimension in addition to a spatial dimension.

Figure 21A:
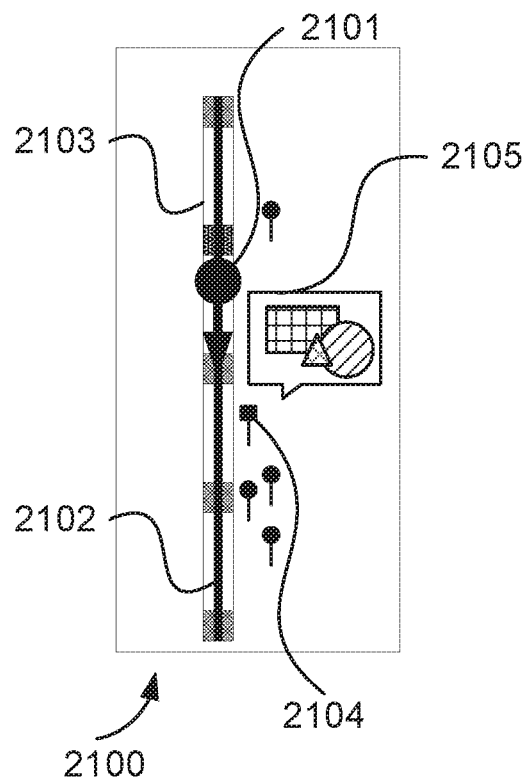
FIG. 21A shows an example map comprising a touch-point and movement-vector, a selected geographical feature, a corresponding dynamic scroll widget and a preview of a currently selected pin.
Figure 21B:
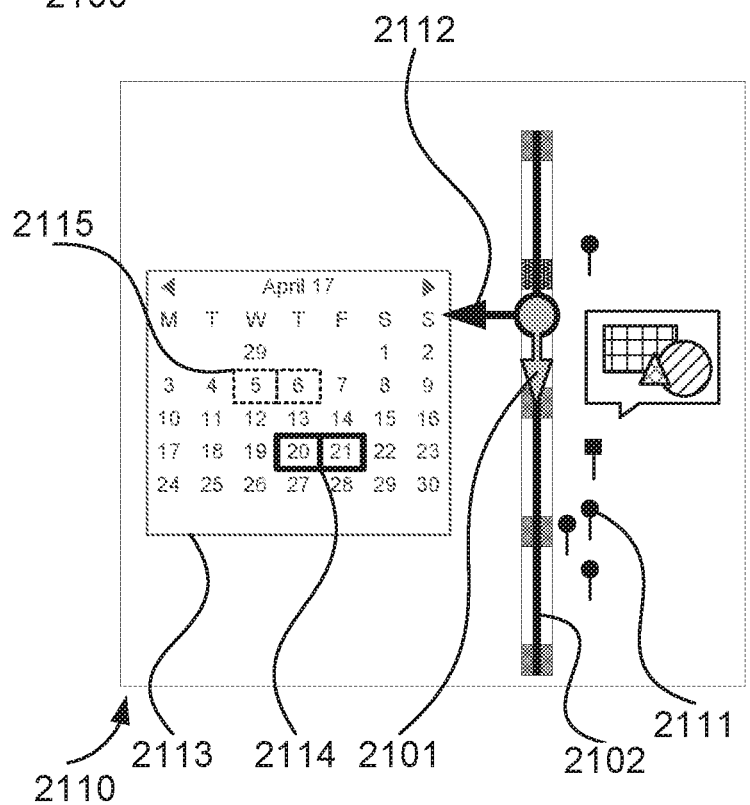
FIG. 21B shows the map of FIG. 21A after the user performs another gesture with a movement vector.

FIG. 21A shows an example map 2100 comprising a touch-point and movement-vector 2101, a selected geographical feature 2102, a corresponding dynamic scroll widget 2103 and a preview 2105 of a currently selected pin 2104 similar to the maps described above.

FIG. 20B shows the map 2110 after the user performs another gesture with a movement vector 2112. In the example of FIG. 20B, a gesture of a flick is performed. In other arrangements, different gestures or action methods may be invoked. For example, in other arrangements, the flick gesture may not be orthogonal to the selected geographical feature 2102. As a result of the flick gesture at movement vector 2112, a transition state may be entered in preparation for a temporal browsing mode, the previous touch-point and movement-vector 2101 is paused and a date-selector 2113 appears in the direction of the flick gesture. The pausing of the touch-point and movement-vector 2101 allows the user's finger (and hence touch point) to come off the screen 114 without ending the gesture that started the transition state being entered. The date-selector 2113 displays dates and indicates on itself which dates are pre-selected days 2114, which dates are unselected-days-with-images-available 2115 and selected additional days 2221 (shown in FIG. 22). Pre-selected days 2114 are the days corresponding to the dates of the images corresponding to the selected pins (e.g., pins 2111). Unselected-days-with-images-available 2115 are days that have images that may be selected pins for the selected geographical feature 2102 if a date-filter had not been applied to the images selected for the selected geographical feature 2102 as at step 230. The date-selector 2113 is not limited to look like a calendar. In other arrangements, the date-selector 2113 may be in the form of a sliding date-range window, or any other form of widget as long as the date-selector enables the selection of days.

Furthermore, the date-selector 2113 is not limited to only selecting a single day. The date-selector 2113 may be configured to select ranges of dates by either individual selection of days or through any suitable start and end date method. The user may return to a previous spatial browsing mode by unselecting the unselected-days-with-images-available 2115, re-placing their finger on the screen 114 displaying the map 2100 and resuming the motion of the touch-point and movement-vector 2101. In returning to the previous spatial browsing mode, the date-selector 2113 disappears and the map 2100 as shown in FIG. 21A is displayed.

Figure 22:
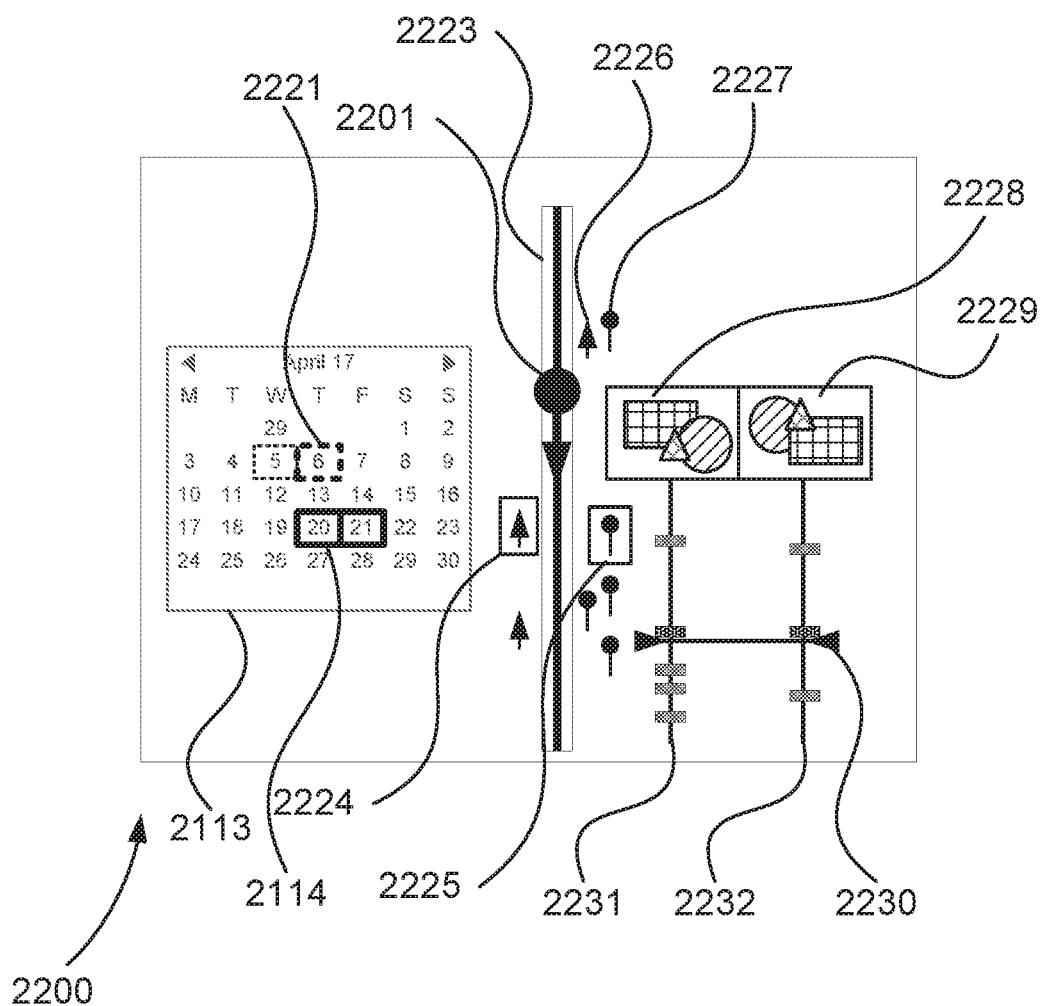
FIG. 22 shows the map of FIG. 21A after the user has selected a selected additional day in the date selector.

FIG. 22 shows the map 2200 after the user has selected a selected additional day 2221 in the date selector 2113. In response to selection of the selected additional day 2221 in the date selector 2113, the transition state shown in FIG. 21B is exited and the temporal browsing mode may be fully entered. In temporal browsing mode, the dynamic scroll widget, if visible, may be shown differently, in order to indicate that the temporal browsing mode has been entered. For example, the dynamic scroll widget may be shown wider, or with a different colour or pattern.

In the temporal browsing mode, shown for example in FIG. 22, the dynamic scroll widget 2103 is transformed from having evenly distributed stages corresponding to selected pins, to a continuous scroll widget 2223. The continuous scroll widget 2223 may be used to remotely control the position of a current progress bar 2230 by the movement of the touch-point and movement-vector 2101, such that the top of the continuous scroll widget 2223 corresponds to the current progress bar 2230 being positioned at top primary timeline 2231 and the timeline 2232, and such that the bottom of the continuous scroll widget 2223 corresponds to the current progress bar 2230 being positioned at the bottom of the primary timeline 2231 and the timeline 2232. In other arrangements, the current progress bar 2230 may be repositioned within the timelines by the user directly. The position of the current progress bar 2230 indicates the current position of primary timeline 2231 and the timeline 2232. In other arrangements, the current position of each timeline may be selected independently.

Each timeline (e.g., 2231) displays stages, which are distributed in the timeline, in proportion to the spatial position of the selected pins relative to the selected geographical feature. In the example of FIG. 22, there are five selected pins, referred to as round-selected-pins 2227 that correspond to the selected pins of the images of the pre-selected days 2114. The example of FIG. 22 also shows a different set of selected pins, referred to as triangle-selected-pins (e.g., 2226), corresponding to the selected pins of the images of additional day 2221. The primary timeline 2231 shows the stages corresponding to the round-selected-pins 2227 and the timeline 2232 shows the stages corresponding to the triangle-selected-pins 2226. In each timeline 2231 and 2232, the stage nearest the current progress bar 2230 is determined to be the current stage for the timeline. The current stage for each time line 2231 and 2232 has the image corresponding to a pin displayed in a preview window. In the example of FIG. 22, preview window 2228 shows the image preview for the current stage in the primary timeline 2231. Similarly, preview window 2229 shows the image preview for the current stage in the timeline 2232. The pins corresponding to the image shown in the preview window are also highlighted on the map 2200 of FIG. 22 by a pin 2224 corresponding to the preview window 2229 being highlighted. Similarly, a pin 2225 corresponding to preview window 2228 is highlighted. The user may thus use the date-selector 2113 to select extra days for which to view selected pin images in the preview windows. The user may then use the touch-point and movement-vector 2201 to iterate through the images corresponding to the selected pins of multiple days and view the corresponding images in the preview windows (e.g., 2229).

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of browsing images on a user interface displaying a map, the method comprising:
    receiving a selection of a geographical feature within the map on the user interface based on a selection criteria comprising a set of predefined gesture rules;
    selecting a plurality of images based on a proximity of each of the images to the selected geographical feature;
    generating a dynamic browsing widget on the user interface having dimensions proportional to dimensions of the selected geographical feature; and
    browsing the selected plurality of images using the generated dynamic browsing widget.

2. The method according to claim 1, wherein the selection of the plurality of images is further based on a tag selected using a gesture on the user interface.

3. The method according to claim 2, wherein the dynamic browsing widget comprises one or more stages and each of the one or more stages has any one of a plurality of decorations, each decoration indicating a value associated with the tag in the image corresponding to the stage.

4. The method according to claim 3, wherein the tag specifies a score type for a subject in the plurality of images.

5. The method according to claim 4, wherein an intensity of the score type is indicated by each decoration.

6. The method according to claim 1, wherein the selected images are distributed along the dynamic browsing widget in an order dependent on a spatial location at which each of the selected images was captured.

7. The method according to claim 6, wherein the selected images are distributed along the dynamic browsing widget at a spacing independent of the spatial location at which each of the selected images was captured.

8. The method according to claim 1, wherein linear properties of the geographical feature affects shape of the dynamic browsing widget.

9. The method according to claim 1, wherein a length of the dynamic browsing widget is proportional to the selected geographical feature.

10. The method according to claim 1, further comprising generating the dynamic browsing widget is further based on spatial location of the selected images.

11. The method according to claim 1, wherein each of the images has associated temporal data.

12. The method according to claim 1, wherein the dynamic browsing widget is generated based on viewing characteristics of the user interface.

13. The method according to claim 1, wherein the dynamic browsing widget is generated based on a value related to a position of the gesture.

14. The method according to claim 13, wherein the images are browsed using the value.

15. The method according to claim 1, wherein the proximity is further based on camera orientation and camera settings.

16. An apparatus for browsing images on a user interface displaying a map, the apparatus comprising:
   a memory for storing data and a computer program;
   a processor coupled to the memory for executing the computer program, the computer program having instructions for:
   receiving a selection of a geographical feature within the map on the user interface based on a selection criteria comprising a set of predefined gesture rules;
   selecting a plurality of images based on a proximity of each of the images to the selected geographical feature;
   generating a dynamic browsing widget on the user interface having dimensions proportional to dimensions of the selected geographical feature; and
   browsing the selected plurality of images using the generated dynamic browsing widget.

17. A system for browsing images on a user interface displaying a map, the system comprising:
   a memory for storing data and a computer program;
   a processor coupled to the memory for executing the computer program, the computer program having instructions for:
   receiving a selection of a geographical feature within the map on the user interface based on a selection criteria comprising a set of predefined gesture rules;
   selecting a plurality of images based on a proximity of each of the images to the selected geographical feature;
   generating a dynamic browsing widget on the user interface having dimensions proportional to dimensions of the selected geographical feature; and
   browsing the selected plurality of images using the generated dynamic browsing widget.

18. A non-transitory computer readable medium having a computer program stored on the medium for browsing images on a user interface displaying a map, the program comprising:
   code for receiving a selection of a geographical feature within the map on the user interface based on a selection criteria comprising a set of predefined gesture rules;
   code for selecting a plurality of images based on a proximity of each of the images to the selected geographical feature;
   code for generating a dynamic browsing widget on the user interface having dimensions proportional to dimensions of the selected geographical feature; and
   code for browsing the selected plurality of images using the generated dynamic browsing widget.

* * * * *